(12) United States Patent
Miyata et al.

(10) Patent No.: US 10,968,854 B2
(45) Date of Patent: Apr. 6, 2021

(54) CONTROLLER AND CONTROL METHOD FOR INTERNAL COMBUSTION ENGINE

(71) Applicant: TOYOTA JIDOSHA KABUSHIKI KAISHA, Toyota (JP)

(72) Inventors: Koumei Miyata, Toyota (JP); Masanori Toya, Toyota (JP); Masanao Idogawa, Toyota (JP); Kosuke Sasaki, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 67 days.

(21) Appl. No.: 16/281,580

(22) Filed: Feb. 21, 2019

(65) Prior Publication Data

US 2019/0301390 A1    Oct. 3, 2019

(30) Foreign Application Priority Data

Mar. 27, 2018  (JP) .............................. JP2018-060404
May 11, 2018   (JP) .............................. JP2018-092491

(51) Int. Cl.
*F02D 41/24*     (2006.01)
*F02D 41/38*     (2006.01)
(Continued)

(52) U.S. Cl.
CPC ..... *F02D 41/2467* (2013.01); *F02D 41/0042* (2013.01); *F02D 41/34* (2013.01);
(Continued)

(58) Field of Classification Search
CPC .. F02D 41/2467; F02D 41/0042; F02D 41/34; F02D 41/3836; F02D 41/40;
(Continued)

(56) References Cited

U.S. PATENT DOCUMENTS 6,062,201 A * 5/2000 Nozawa ............... F02D 13/0219
                                                   123/478
7,900,605 B2 * 3/2011 Dingle ................ F02D 41/3827
                                                   123/480

(Continued)

FOREIGN PATENT DOCUMENTS

EP    2138713 A1    12/2009
JP    H05-256172 A  10/1993
(Continued)

*Primary Examiner* — David Hamaoui
*Assistant Examiner* — John D Bailey
(74) *Attorney, Agent, or Firm* — Oliff PLC

(57) ABSTRACT

A port injection valve injects fuel into an intake passage. A base injection amount is an injection amount proportional to an amount of fresh air introduced into a cylinder of an internal combustion engine. A division process involves dividing the base injection amount into a synchronous injection amount and an asynchronous injection amount. In an intake-synchronous injection, the fuel is injected in synchronization with a period in which an intake valve is open. In an intake-asynchronous injection, the fuel is injected at a time advanced with respect to the intake-synchronous injection. In a selective correction process, the asynchronous injection amount is corrected according to a required correction amount for the base injection amount, and the synchronous injection amount is not corrected.

15 Claims, 12 Drawing Sheets

(51) Int. Cl.
  *F02D 41/40* (2006.01)
  *F02D 41/00* (2006.01)
  *F02D 41/34* (2006.01)
  *F02D 41/14* (2006.01)
  *F02D 41/04* (2006.01)

(52) U.S. Cl.
  CPC ......... *F02D 41/3836* (2013.01); *F02D 41/40* (2013.01); *F02D 41/047* (2013.01); *F02D 41/1454* (2013.01); *F02D 2200/021* (2013.01); *F02D 2200/0602* (2013.01); *F02D 2250/31* (2013.01); *F02D 2250/38* (2013.01)

(58) Field of Classification Search
  CPC ............... F02D 41/047; F02D 41/1454; F02D 2200/021; F02D 2200/0602; F02D 2250/31; F02D 2250/38
  USPC .......................................................... 701/103
  See application file for complete search history.

(56) References Cited

U.S. PATENT DOCUMENTS

| | | | | |
|---|---|---|---|---|
| 8,126,632 | B2* | 2/2012 | Pallett | F02D 41/0007 701/103 |
| 8,281,766 | B2* | 10/2012 | Tomiita | F02M 61/1853 123/432 |
| 8,670,919 | B2 | 3/2014 | Protin et al. | |
| 8,899,212 | B2* | 12/2014 | Leone | F02N 19/00 123/491 |
| 2005/0071073 | A1* | 3/2005 | Ueda | F02P 5/1506 701/101 |
| 2008/0147298 | A1* | 6/2008 | Suda | F02P 5/1506 701/103 |
| 2009/0234557 | A1* | 9/2009 | Hirowatari | F02D 41/402 701/103 |
| 2010/0250100 | A1* | 9/2010 | Tomiita | F02M 61/1853 701/104 |
| 2011/0184629 | A1* | 7/2011 | Krengel | F02D 41/3076 701/103 |
| 2012/0318237 | A1* | 12/2012 | Tsukagoshi | F02D 41/34 123/445 |
| 2014/0188370 | A1* | 7/2014 | Pallett | F02D 41/04 701/103 |
| 2016/0061140 | A1* | 3/2016 | Hotta | F02D 21/08 123/492 |
| 2016/0273475 | A1* | 9/2016 | Dodate | F02D 41/34 |
| 2019/0032592 | A1* | 1/2019 | Tsuyuki | F02D 41/0042 |

FOREIGN PATENT DOCUMENTS

| | | |
|---|---|---|
| JP | 2007-107405 A | 4/2007 |
| JP | 2013-209938 A | 10/2013 |
| JP | 2019-044760 A | 3/2019 |
| JP | 2019-190448 A | 10/2019 |
| WO | 2019/049674 A1 | 3/2019 |
| WO | 2019/049675 A1 | 3/2019 |
| WO | 2019/049676 A1 | 3/2019 |

* cited by examiner

CONTROLLER AND CONTROL METHOD FOR INTERNAL COMBUSTION ENGINE

BACKGROUND

The present disclosure relates to a controller and a control method for an internal combustion engine. The internal combustion engine which incorporates the controller or to which the control method is applied includes a port injection valve through which fuel is injected into an intake passage.

For example, the controller described in Japanese Patent Laid-Open No. 5-256172 divides the required injection amount, which is determined based on the amount of fresh air introduced into a cylinder of an internal combustion engine, between a leading injection, which is an injection during the intake stroke, and a trailing injection, which is an injection during the subsequent combustion stroke. More specifically, the controller calculates the required injection amount by correcting the injection amount depending on the amount of introduced fresh air according to coolant temperature. Furthermore, the controller divides the required injection amount by a division ratio and corrects one of the divisional injection amounts to determine the final injection amount for the leading injection.

That is, the fuel injection controller according to the literature described above executes a multiple injection process that involves dividing the required amount of fuel, which is based on the amount of intake air, between an intake stroke injection and an exhaust stroke injection and manipulating a port injection valve to inject the fuel in a divisional manner. The intake stroke injection is an injection of fuel in the intake stroke, and the exhaust stroke injection is an injection of fuel in the exhaust stroke.

SUMMARY

Examples of the present disclosure will now be described.

Example 1

A controller for an internal combustion engine is provided. The internal combustion engine incorporating the controller includes a port injection valve that injects fuel into an intake passage. The controller is configured to perform: a base injection amount calculation process of calculating a base injection amount, the base injection amount being an injection amount proportional to an amount of fresh air introduced into a cylinder of the internal combustion engine; a division process of dividing the base injection amount into a synchronous injection amount and an asynchronous injection amount, the synchronous injection amount being an injection amount of an intake-synchronous injection in which the fuel is injected in synchronization with a period in which an intake valve is open, and the asynchronous injection amount being an injection amount of an intake-asynchronous injection in which the fuel is injected at a time advanced with respect to the intake-synchronous injection; a required correction amount outputting process of outputting a required correction amount for the base injection amount; a selective correction process of correcting the asynchronous injection amount according to the required correction amount and not correcting the synchronous injection amount; and a manipulation process of manipulating the port injection valve according to the synchronous injection amount and the corrected asynchronous injection amount.

With the configuration described above, while the asynchronous injection amount is corrected according to the required correction amount, the synchronous injection amount is not corrected. Therefore, compared with a case where both the asynchronous injection amount and the synchronous injection amount are corrected according to the required correction amount, the synchronous injection amount can be more easily maintained at an adequate value for reducing PN, which is the count of particulate matter (PM).

The inventors have studied the possibility of injecting part of the required injection amount by intake-synchronous injection instead of injecting the whole of the required injection amount of fuel by intake-asynchronous injection, in order to reduce PN, which is the count of particulate matter (PM) in the exhaust gas. In the intake-asynchronous injection, fuel is injected in advance of the intake stroke. In the intake-synchronous injection, fuel is injected in synchronization with the time when the intake valve is opened. The inventors have found that it can be difficult to sufficiently reduce PN if the injection amount of the intake-synchronous injection varies as a result of the injection amount responsive to the amount of the introduced fresh air being corrected in terms of various factors. The configuration described above addresses this possibility.

Example 2

In the controller for an internal combustion engine of Example 1, the required correction amount includes a required amount for setting a decrement of the base injection amount to be greater when a disturbing fuel ratio is higher than when the disturbing fuel ratio is lower by a feedforward control based on the disturbing fuel ratio. The disturbing fuel ratio is a ratio of an amount of fuel flowing into the combustion chamber other than the fuel injected from the port injection valve to an amount of fuel flowing into the combustion chamber of the internal combustion engine in one combustion cycle.

If there is fuel flowing into the combustion chamber other than the fuel injected from the port injection valve, that fuel can cause the amount of fuel supplied to the combustion chamber to be excessive for the amount of fresh air introduced into the combustion chamber. To avoid this, with the configuration described above, a required correction amount is output to reduce the base injection amount according to the disturbing fuel ratio. Therefore, the effect of the fuel flowing into the combustion chamber other than the fuel injected form the port injection valve can be compensated for by feedforward control. In particular, with the configuration described above, the asynchronous injection amount is corrected by the feedforward control, and therefore, the synchronous injection amount can be prevented from varying due to the feedforward control.

Example 3

In the controller of Example 2, the internal combustion engine includes a canister that collects fuel vapor from a fuel tank, which stores the fuel injected from the port injection valve, and an adjusting device that adjusts an amount of fluid flowing from the canister into the intake passage. The controller is configured to perform a flow rate control process of controlling a flow rate of the fuel vapor flowing from the canister into the intake passage by manipulating the adjusting device. The required correction amount includes a required amount for setting the decrement of the base injection amount to be greater when a vapor ratio as the disturbing fuel ratio is high than when the vapor ratio is low.

The vapor ratio is a ratio of the flow rate of the fuel vapor to the flow rate of the fluid in the intake passage.

The fuel vapor flowing from the canister into the intake passage causes the amount of fuel flowing into the combustion chamber to be excessive for the base injection amount. To avoid this, with the configuration described above, the base injection amount is reduced according to the vapor ratio by feedforward control. In particular, with the configuration described above, the asynchronous injection amount is corrected by the feedforward control, and therefore, the synchronous injection amount can be prevented from varying due to the feedforward control.

Example 4

In the controller of any one of Examples 1 to 3, the required correction amount includes a required amount for setting an increment of the base injection amount to be greater when a temperature of the internal combustion engine is low than when the temperature is high.

Even if the amount of the fuel injected from the port injection valve is fixed, the amount of the fuel actually burnt in the combustion chamber is smaller when the temperature in the combustion chamber is low than when the temperature is high. In view of this, with the configuration described above, when the temperature is low, a required correction amount for increasing the increment of the base injection amount is output in order to increase the injection amount by feedforward control. In particular, with the configuration described above, the asynchronous injection amount is corrected by the feedforward control, and therefore, the synchronous injection amount can be prevented from varying due to the feedforward control.

Example 5

In the controller of any one of Examples 1 to 4, the required correction amount includes a required amount for correcting the base injection amount according to a manipulation amount for feedback-controlling a detection value of an air-fuel ratio sensor to a target value. The air-fuel ratio sensor is provided in an exhaust passage of the internal combustion engine.

With the configuration described above, since only the asynchronous injection amount is corrected by a feedback correction amount, the synchronous injection amount can be prevented from varying due to the feedback control.

Example 6

In the controller of any one of Examples 1 to 5, the required correction amount includes a required amount for correcting the base injection amount according to a variation of the amount of fresh air in a transient period in which the amount of the introduced fresh air varies.

When the amount of the introduced fresh air varies, the amount of fuel deposited in the intake passage varies, and therefore, the amount of fuel flowing into the combustion chamber deviates from the base injection amount. In view of this, with the configuration described above, the deviation is compensated for by feedforward control in the transient period. In particular, with the configuration described above, since the asynchronous injection amount is corrected by feedforward control, the synchronous injection amount can be prevented from varying due to the feedforward control.

Example 7

The controller is further configured to perform a required injection amount setting process of setting a required injection amount for adjusting an air-fuel ratio to a target air-fuel ratio based on the amount of fresh air introduced into the cylinder of the internal combustion engine. The division process involves dividing the required injection amount into the asynchronous injection amount and the synchronous injection amount, and manipulating the port injection valve to successively injecting the asynchronous injection amount of fuel and the synchronous injection amount of fuel. The manipulation process includes a process of setting the required injection amount to be higher when a temperature of the internal combustion engine is low than when the temperature is high, the process setting an increment of the synchronous injection amount at the time when the temperature of the internal combustion engine is low with respect to the time when the temperature is high to be smaller than an increment of the asynchronous injection amount at the time when the temperature of the internal combustion engine is low with respect to the time when the temperature is high.

Even if the amount of the fuel injected from the port injection valve is fixed, the amount of the fuel actually burnt in the combustion chamber is smaller when the temperature of the internal combustion engine is low than when the temperature is high. In view of this, with the configuration described above, when the temperature is low, the required injection amount is increased, thereby preventing the amount of fuel actually burnt from becoming insufficient. In this regard, with the configuration described above, the increment of the synchronous injection amount is set smaller than the increment of the asynchronous injection amount. Therefore, even if the required injection amount is increased when the temperature of the internal combustion engine is low, a variation of the synchronous injection amount can be reduced, and therefore, the synchronous injection amount can be easily set at an adequate value for reducing PN.

Example 8

In the controller of Example 7, the manipulation process includes a process of setting the required injection amount to be smaller when a disturbing fuel ratio is high than when the disturbing fuel ratio is low, the process setting a decrement of the synchronous injection amount at the time when the disturbing fuel ratio is high with respect to the time when the disturbing fuel ratio is low to be smaller than a decrement of the asynchronous injection amount at the time when the disturbing fuel ratio is high with respect to the time when the disturbing fuel ratio is low. The disturbing fuel ratio is a ratio of an amount of fuel flowing into the combustion chamber other than the fuel injected from the port injection valve to an amount of fuel flowing into the combustion chamber of the internal combustion engine in one combustion cycle.

If there is fuel flowing into the combustion chamber other than the fuel injected from the port injection valve, that fuel can cause the amount of fuel supplied to the combustion chamber to be excessive for the amount of fresh air introduced into the combustion chamber. To avoid this, with the configuration described above, the required injection amount is reduced according to the disturbing fuel ratio. Therefore, the effect of the fuel flowing into the combustion chamber other than the fuel injected form the port injection valve can be compensated for. In this regard, the increment of the synchronous injection amount is set smaller than the increment of the asynchronous injection amount. Therefore, even if the required injection amount is reduced, a variation of the synchronous injection amount can be reduced, and therefore, the synchronous injection amount can be easily set at an adequate value for reducing PN.

Example 9

In the controller of Example 8, the internal combustion engine includes a canister that collects fuel vapor from a fuel tank, which stores the fuel injected from the port injection valve, and an adjusting device that adjusts an amount of fluid flowing from the canister into the intake passage. The controller is configured to perform a flow rate control process of controlling a flow rate of the fuel vapor flowing from the canister into the intake passage by manipulating the adjusting device. The manipulation process includes a process of setting the required injection amount to be smaller when a vapor ratio as the disturbing fuel ratio is high than when the vapor ratio is low, the process setting a decrement of the synchronous injection amount at the time when the vapor ratio is high with respect to the time when the vapor ratio is low to be smaller than a decrement of the asynchronous injection amount at the time when the vapor ratio is high with respect to the time when the vapor ratio is low. The vapor ratio is a ratio of the flow rate of the fuel vapor to the flow rate of the fluid in the intake passage.

The fuel vapor flowing from the canister into the intake passage causes the amount of fuel flowing into the combustion chamber to be excessive for the required injection amount. To avoid this, with the configuration described above, the required injection amount is reduced according to the vapor ratio. In particular, with the configuration described above, the decrement of the synchronous injection amount is set smaller than the decrement of the asynchronous injection amount. Therefore, even if the required injection amount is reduced, a variation of the synchronous injection amount can be reduced, and therefore, the synchronous injection amount can be easily set at an adequate value for reducing PN.

Example 10

In the controller of any one of Examples 7 to 9, the manipulation process includes a process of correcting the required injection amount in a transient period in which the amount of the introduced fresh air varies, the process setting an absolute value of a correction ratio of the synchronous injection amount in the transient period to be smaller than an absolute value of a correction ratio of the asynchronous injection amount in the transient period.

Example 11

In the controller of any one of Examples 1 to 10, in which the controller is configured to execute: a required injection amount calculation process of calculating a required injection amount for adjusting an air-fuel ratio to a target air-fuel ratio based on the amount of fresh air introduced into the cylinder of the internal combustion engine; a multiple injection process of manipulating the port injection valve to perform the intake-synchronous injection and the intake-asynchronous injection to inject the required injection amount of fuel; a fuel reduction process of reducing the required injection amount even when the amount of the introduced fresh air does not vary if a predetermined condition is satisfied; and a dual fuel amount correction process of increasing the asynchronous injection amount to be equal to or greater than a minimum injection amount allowable for the port injection valve and reducing the synchronous injection amount if the asynchronous injection amount is smaller than the minimum injection amount, the asynchronous injection amount being determined by the required injection amount reduced in the fuel reduction process.

With the configuration described above, when the asynchronous injection amount is smaller than the minimum injection amount, the asynchronous injection amount is increased to be equal to or greater than the minimum injection amount, and the synchronous injection amount is reduced. Therefore, the sum of the asynchronous injection amount and the synchronous injection amount can be prevented from deviating from the required injection amount, while preventing the asynchronous injection amount from being smaller than the minimum injection amount. Therefore, deterioration of the controllability of the injection amount can be prevented.

The inventors have found that, in the multiple injection process, the problems described below can occur when the fuel injection amount, which is determined by the amount of fresh air introduced into the combustion chamber, is corrected in various ways. That is, at least one of the divisional injection amounts can be smaller than the minimum injection amount for the port injection valve, and in that case, the controllability of the injection amount can decrease, and the characteristics of the exhaust gas can deteriorate. The configuration described above addresses such problems.

Example 12

In the controller of Example 11, the dual fuel amount correction process is to designate a difference between the asynchronous injection amount yet to be corrected and the minimum injection amount as an increasing correction amount for the asynchronous injection amount and a reduction correction amount for the synchronous injection amount. The controller is further configured to perform a selection process of selecting either a single injection process or the multiple injection process, the single injection process involving injecting the required injection amount of fuel by the intake-asynchronous injection by manipulating the port injection valve. The selection process includes a process of selecting the single injection process if the synchronous injection amount reduced by the reduction correction amount is smaller than the minimum injection amount.

Since the difference between the asynchronous injection amount and the minimum injection amount is used as a reduction correction amount for the synchronous injection amount to correct the synchronous injection amount, if the synchronous injection amount is smaller than the minimum injection amount, the asynchronous injection amount and the synchronous injection amount cannot be set to be equal to or greater than the minimum injection amount at the same time while executing the multiple injection process. To avoid this, with the configuration described above, the single injection process is executed in such a case. Therefore, the amount of the fuel injected from the port injection valve can be adequately prevented from being smaller than the minimum injection amount.

Example 13

In the controller of Example 11 or 12, the predetermined condition includes a condition that the amount of fresh air decreases, and the fuel reduction process includes a transient correction process of reducing the required injection amount by reducing the asynchronous injection amount if the amount of fresh air decreases.

When the amount of fresh air decreases, the amount of fuel deposited in the intake passage transiently decreases, and the decrement adds to the amount of fuel flowing into the combustion chamber. In this case, in adjusting the air-fuel ratio to the target air-fuel ratio, the required injection amount calculated based on the amount of fresh air can be excessive. In view of this, with the configuration described above, when the amount of fresh air decreases, the asynchronous injection amount is reduced to prevent the required injection amount from becoming excessive. However, in that case, the asynchronous injection amount can be smaller than the minimum injection amount. To avoid this, the dual fuel amount correction process is particularly advantageous.

Example 14

In the controller of any one of Examples 11 to 13, the controller is further configured to perform a selection process of selecting either a single injection process or the multiple injection process, the single injection process involving injecting the required injection amount of fuel by the intake-asynchronous injection by manipulating the port injection valve. The predetermined condition includes a condition that switching from a state where the single injection process is selected to a state where the multiple injection process is selected occurs. The fuel reduction process includes a transient correction process of reducing the required injection amount by reducing the asynchronous injection amount if switching from the state where the single injection process is selected in the selection process to the state where the multiple injection process is selected occurs.

The amount of fuel deposited in the intake passage is smaller in the intake-synchronous injection than in the intake-asynchronous injection. Therefore, the amount of fuel deposited in the intake passage is smaller when the multiple injection process is being executed than when the single injection process is being executed. Therefore, if switching from the single injection process to the multiple injection process occurs, the amount of fuel deposited in the intake passage transiently decreases, and the decrement adds to the amount of fuel flowing into the combustion chamber, so that the required injection amount calculated based on the amount of fresh air can be excessive in adjusting the air-fuel ratio to the target air-fuel ratio. In view of this, with the configuration described above, when switching to the multiple injection process occurs, the asynchronous injection amount is reduced, thereby preventing the required injection amount from becoming excessive. However, in that case, the asynchronous injection amount can be smaller than the minimum injection amount, and therefore, the dual fuel amount correction process is particularly advantageous.

Example 15

In the controller of any one of Examples 11 to 14, the division process involves dividing the required injection amount into the asynchronous injection amount and the synchronous injection amount, and the fuel reduction process is a process of reducing only the asynchronous injection amount.

The characteristics of the exhaust gas can more largely vary when the synchronous injection amount is changed than when the asynchronous injection amount is changed. In view of this, with the configuration described above, the fuel reduction process is executed only for the asynchronous injection amount. Therefore, deterioration of the characteristics of the exhaust gas due to the fuel reduction process can be prevented.

Example 16

A controller for an internal combustion engine is provided. The internal combustion engine incorporating the controller includes a port injection valve that injects fuel into an intake passage, and the controller is configured to perform: a required injection amount setting process of setting a required injection amount for adjusting an air-fuel ratio to a target air-fuel ratio based on the amount of fresh air introduced into the cylinder of the internal combustion engine; and a manipulation process for dividing the required injection amount into the synchronous injection amount and the asynchronous injection amount, and manipulating the port injection valve to successively injecting the asynchronous injection amount of fuel and the synchronous injection amount of fuel. The synchronous injection amount is an injection amount of an intake-synchronous injection in which the fuel is injected in synchronization with a period in which an intake valve is open. The asynchronous injection amount is an injection amount of an intake-asynchronous injection in which the fuel is injected at a time advanced with respect to the intake-synchronous injection. The manipulation process includes a process of setting the required injection amount to be higher when a temperature of the internal combustion engine is low than when the temperature is high, the process setting an increment of the synchronous injection amount at the time when the temperature of the internal combustion engine is low with respect to the time when the temperature is high to be smaller than an increment of the asynchronous injection amount at the time when the temperature of the internal combustion engine is low with respect to the time when the temperature is high.

Example 17

A controller for an internal combustion engine is provided. The engine incorporating the controller includes a port injection valve that injects fuel into an intake passage. The controller is configured to execute: a required injection amount setting process of setting a required injection amount for adjusting an air-fuel ratio to a target air-fuel ratio based on the amount of fresh air introduced into the cylinder of the internal combustion engine; and a manipulation process for dividing the required injection amount into the synchronous injection amount and the asynchronous injection amount, and manipulating the port injection valve to successively injecting the asynchronous injection amount of fuel and the synchronous injection amount of fuel. The synchronous injection amount is an injection amount of an intake-synchronous injection in which the fuel is injected in synchronization with a period in which an intake valve is open. The asynchronous injection amount is an injection amount of an intake-asynchronous injection in which the fuel is injected at a time advanced with respect to the intake-synchronous injection. The manipulation process includes a process of setting the required injection amount to be smaller when a disturbing fuel ratio is high than when the disturbing fuel ratio is low, the process setting a decrement of the synchronous injection amount at the time when the disturbing fuel ratio is high with respect to the time when the disturbing fuel ratio is low to be smaller than a decrement of the asynchronous injection amount at the time when the disturbing fuel ratio is high with respect to the time when the disturbing fuel ratio is low. The disturbing fuel ratio is a ratio of an amount of fuel flowing into the combustion chamber other than the fuel injected from the port injection valve to an amount of fuel flowing into the combustion chamber of the internal combustion engine in one combustion cycle.

The disturbing fuel flowing into the combustion chamber, which is the fuel other than the fuel injected from the port injection valve, causes the amount of fuel flowing into the combustion chamber to be excessive for the amount of required injection amount. To avoid this, with the configuration described above, the required injection amount is reduced according to the disturbing fuel ratio. In particular, with the configuration described above, the decrement of the synchronous injection amount is set smaller than the decrement of the asynchronous injection amount. Therefore, even if the required injection amount is reduced, a variation of the synchronous injection amount can be reduced, and therefore, the synchronous injection amount can be easily set at an adequate value for reducing PN.

Example 18

A controller for an internal combustion engine is provided. The engine incorporating the controller includes a port injection valve that injects fuel into an intake passage. The controller is configured to execute: a required injection amount setting process of setting a required injection amount for adjusting an air-fuel ratio to a target air-fuel ratio based on the amount of fresh air introduced into the cylinder of the internal combustion engine; and a manipulation process for dividing the required injection amount into the synchronous injection amount and the asynchronous injection amount, and manipulating the port injection valve to successively injecting the asynchronous injection amount of fuel and the synchronous injection amount of fuel. The synchronous injection amount is an injection amount of an intake-synchronous injection in which the fuel is injected in synchronization with a period in which an intake valve is open. The asynchronous injection amount is an injection amount of an intake-asynchronous injection in which the fuel is injected at a time advanced with respect to the intake-synchronous injection. The manipulation process includes a process of correcting the required injection amount in a transient period in which the amount of the introduced fresh air varies, the process setting an absolute value of a correction ratio of the synchronous injection amount in the transient period to be smaller than an absolute value of a correction ratio of the asynchronous injection amount in the transient period.

If the amount of the introduced fresh air varies, the amount of fuel deposited in the intake passage can vary, and therefore, the amount of fuel flowing into the combustion chamber can be excessive or insufficient. To avoid this, in both the configurations in Examples 10 and 18, the required injection amount is corrected to compensate for the deviation in the transient period. In particular, in both the configurations in Examples 10 and 18, the absolute value of the correction ratio for the synchronous injection amount is set to be smaller than the absolute value of the correction ratio for the asynchronous injection amount. Therefore, even when the required injection amount is corrected, the variation of the synchronous injection amount can be reduced, and therefore, the synchronous injection amount can be maintained at an adequate value for reducing PN.

Example 19

A controller for fuel injection of an internal combustion engine is provided. The engine incorporating the controller includes a port injection valve that injects fuel into an intake passage. The controller is configured to execute: a required injection amount calculation process of calculating a required injection amount for adjusting an air-fuel ratio to a target air-fuel ratio based on the amount of fresh air introduced into the cylinder of the internal combustion engine; a multiple injection process of performing an intake-synchronous injection and an intake-asynchronous injection to inject the required injection amount of fuel by manipulating the port injection valve, the intake-synchronous injection involving injecting the fuel in synchronization with a period in which an intake valve is open, and the intake-asynchronous injection involving injecting the fuel at a time advanced with respect to the intake-synchronous injection; a fuel reduction process of reducing the required injection amount even when the amount of the introduced fresh air does not vary if a predetermined condition is satisfied; and a dual fuel amount correction process of increasing the asynchronous injection amount to be equal to or greater than a minimum injection amount allowable for the port injection valve and reducing the synchronous injection amount if the asynchronous injection amount is smaller than the minimum injection amount, the asynchronous injection amount being an injection amount of the intake-asynchronous injection and being determined by the required injection amount reduced in the fuel reduction process, and the synchronous injection amount being an injection amount of the intake-synchronous injection.

Example 20

A control method for an internal combustion engine is provided. The engine includes a port injection valve that injects fuel into an intake passage. The method includes: a base injection amount calculation process of calculating a base injection amount, the base injection amount being an injection amount proportional to an amount of fresh air introduced into a cylinder of the internal combustion engine; a division process of dividing the base injection amount into a synchronous injection amount and an asynchronous injection amount, the synchronous injection amount being an injection amount of an intake-synchronous injection in which the fuel is injected in synchronization with a period in which an intake valve is open, and the asynchronous injection amount being an injection amount of an intake-asynchronous injection in which the fuel is injected at a time advanced with respect to the intake-synchronous injection; a required correction amount outputting process of outputting a required correction amount for the base injection amount; a selective correction process of correcting the asynchronous injection amount according to the required correction amount and not correcting the synchronous injection amount; and a manipulation process of manipulating the port injection valve according to the synchronous injection amount and the corrected asynchronous injection amount.

Other aspects and advantages of the present disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferred embodiments together with the accompanying drawings in which.

DETAILED DESCRIPTION

A controller for an internal combustion engine according to a first embodiment of the present disclosure will now be described with reference to FIGS. 1 to 9.

Figure 1:
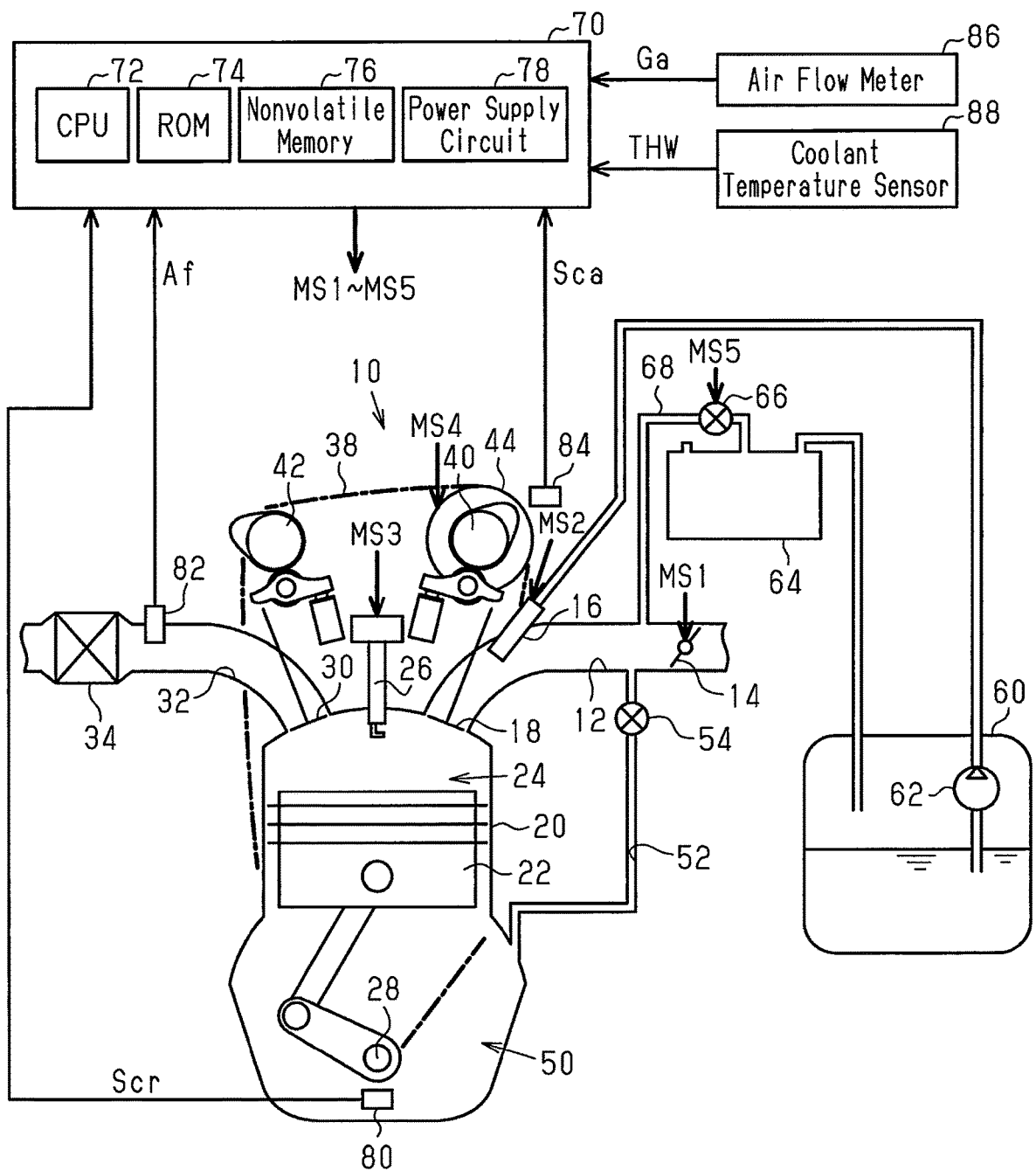
FIG. 1 is a diagram showing a controller for an internal combustion engine according to a first embodiment of the present disclosure and the internal combustion engine.

In an internal combustion engine 10 shown in FIG. 1, a throttle valve 14 is arranged in an intake passage 12, and a port injection valve 16 is arranged downstream of the throttle valve 14. Air taken into the intake passage 12 and fuel injected from the port injection valve 16 flow into a combustion chamber 24, which is defined by a cylinder 20 and a piston 22, when an intake valve 18 opens. In the combustion chamber 24, the air-fuel mixture is burned by a spark discharge from an ignition device 26, and the combustion energy thus generated is converted into a rotational energy for a crankshaft 28 via the piston 22. The burnt air-fuel mixture is discharged to an exhaust passage 32 as an exhaust gas when an exhaust valve 30 opens. A catalyst 34 is provided in the exhaust passage 32.

A rotational motive power of the crankshaft 28 is transmitted to an intake camshaft 40 and an exhaust camshaft 42 via a timing chain 38. In this embodiment, the motive power is transmitted from the timing chain 38 to the intake camshaft 40 via an intake valve timing adjusting device 44. The intake valve timing adjusting device 44 is an actuator that adjusts the timing of opening of the intake valve 18 by adjusting the rotational phase difference between the crankshaft 28 and the intake camshaft 40.

A crankcase 50 is connected to the intake passage 12 by a blow-by gas passage 52. A PCV valve 54 that adjusts the cross-sectional area of the flow path of the blow-by gas passage 52 is provided in the blow-by gas passage 52. The PCV valve 54 is a mechanical valve body that opens in response to the pressure on the side of the crankcase 50 becoming higher than the pressure on the side of the intake passage 12 by a predetermined pressure.

The fuel injected from the port injection valve 16 is stored in a fuel tank 60. The fuel is drawn up from the fuel tank 60 by a fuel pump 62 and is discharged to the port injection valve 16. Fuel vapor in the fuel tank 60 is collected in a canister 64. The canister 64 and the intake passage 12 are connected to each other by a purge passage 68. The cross-sectional area of the flow path for fluid in the purge passage 68 can be adjusted by a purge valve 66.

A controller 70 is intended to control the internal combustion engine 10. To control controlled amounts of the internal combustion engine 10 (torque, constituents of exhaust gas or the like), the controller 70 controls manipulating parts of the internal combustion engine 10, such as the throttle valve 14, the port injection valve 16, the ignition device 26, and the intake valve timing adjusting device 44. To this end, the controller 70 refers to an air-fuel ratio Af detected by an air-fuel ratio sensor 82 provided upstream of the catalyst 34 and an output signal Sca of an intake cam angle sensor 84. Furthermore, the controller 70 refers to an intake air amount Ga detected by an air flow meter 86 and a temperature of coolant (coolant temperature THW) of the internal combustion engine 10 detected by a coolant temperature sensor 88.

The controller 70 includes a CPU 72, a ROM 74, a nonvolatile memory 76 that can be electrically rewritten, and a power supply circuit 78. The controller 70 controls the controlled amounts described above by the CPU 72 executing a program stored in the ROM 74. The power supply circuit 78 supplies electric power to each part of the controller 70.

Figure 2:
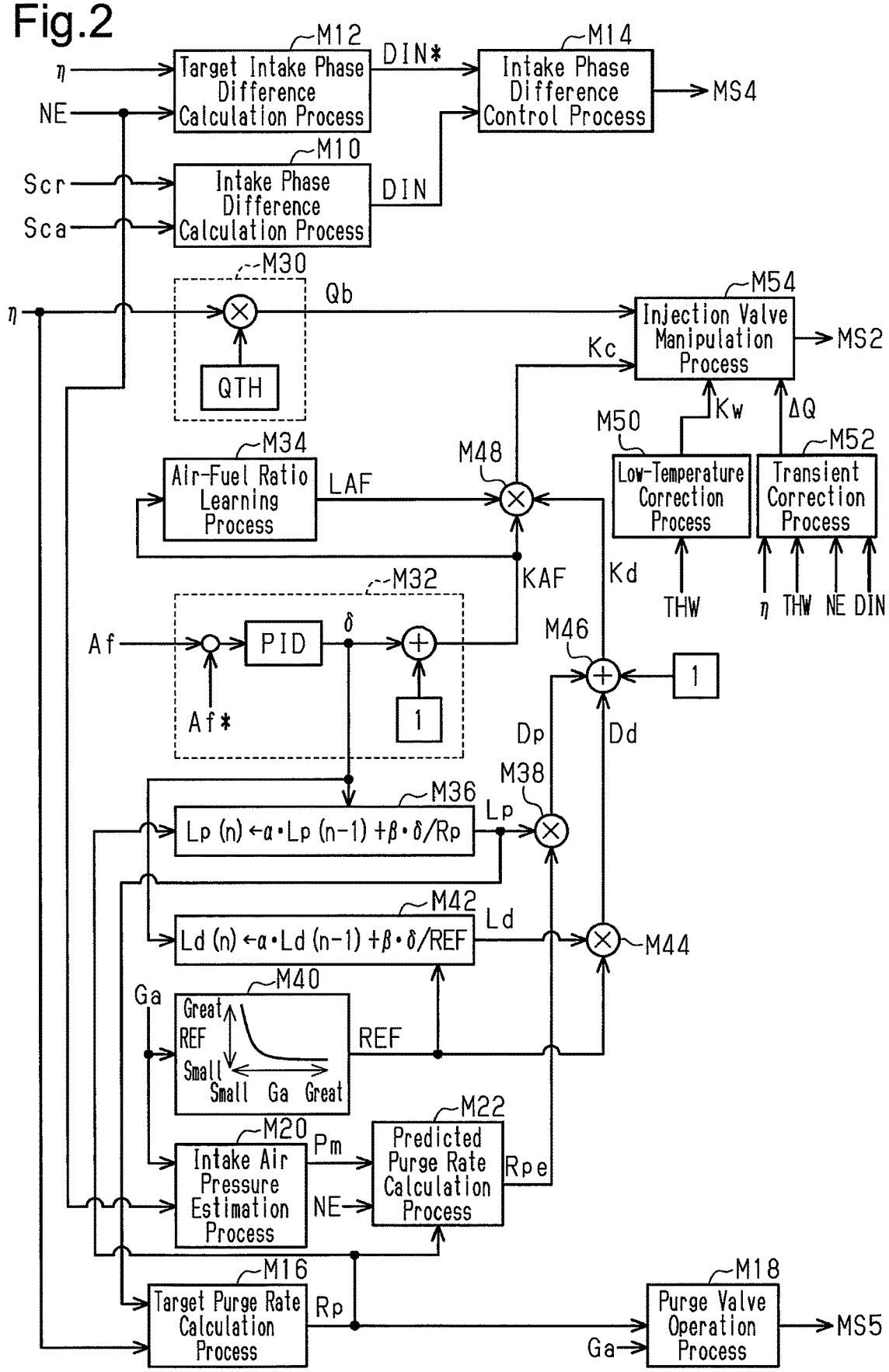
FIG. 2 is a block diagram showing some of processes executed by the controller in the internal combustion engine shown in FIG. 1.

FIG. 2 shows some of processes executed by the controller 70. The processes shown in FIG. 2 are implemented by the CPU 72 executing a program stored in the ROM 74.

An intake phase difference calculation process M10 is a process of calculating an intake phase difference DIN, which is a phase difference between a rotational angle of the crankshaft 28 and a rotational angle of the intake camshaft 40, based on an output signal Scr of the crank angle sensor 80 and the output signal Sca of the intake cam angle sensor 84. A target intake phase difference calculation process M12 is a process of variably setting a target intake phase difference DIN* based on an operating point of the internal combustion engine 10. In this embodiment, the operating point is defined by an engine speed NE and a charging efficiency η. The CPU 72 calculates the engine speed NE based on the output signal Scr of the crank angle sensor 80, and calculates the charging efficiency η based on the engine speed NE and the intake air amount Ga. The charging efficiency η is a parameter (KL) that determines the amount of the fresh air introduced into the combustion chamber 24.

An intake phase difference control process M14 is a process of outputting a manipulation signal MS4 to manipulate the intake valve timing adjusting device 44 to adjust the intake phase difference DIN to the target intake phase difference DIN*.

A target purge rate calculation process M16 is a process of calculating a target purge rate Rp based on the charging efficiency η and a purge concentration learned value Lp. The purge rate is the flow rate of the fluid flowing from the canister 64 into the intake passage 12 divided by the intake air amount Ga, and the target purge rate Rp is a control target value of the purge rate.

A purge valve manipulation process M18 is a process of outputting a manipulation signal MS5 to a purge valve 66 to manipulate the purge valve 66 to set the purge rate at the target purge rate Rp based on the intake air amount Ga. Provided that the target purge rate Rp is fixed, the lower the intake air amount Ga, the lower the opening of the purge valve 66 set in the purge valve manipulation process M18 becomes. This is because the lower the intake air amount Ga, the higher the extent to which the pressure in the intake passage 12 is lower than the pressure in the canister 64, and therefore the more easily fluid flows from the canister 64 into the intake passage 12.

An intake air pressure estimation process M20 is a process of calculating an intake air pressure Pm, which is a pressure in the intake passage 12 at a location downstream of the throttle valve 14, based on the engine speed NE and the intake air amount Ga. For example, the intake air pressure estimation process M20 can be a process of calculating the intake air pressure Pm using an intake manifold model and an intake valve model. The intake manifold model is designed to calculate the intake air pressure Pm based on a valve-closing inflow air amount and the intake air amount Ga. The valve-closing inflow air amount is the amount of the air flowing into the combustion chamber 24 in one combustion cycle minus the amount of the air blown back to the intake passage 12 until the intake valve 18 is closed. More specifically, the intake manifold model is designed to calculate the intake air pressure Pm in such a manner that the intake air pressure Pm increases at a higher rate as the value obtained by subtracting the valve-closing inflow air amount from the amount of intake air per cylinder calculated from the intake air amount Ga becomes greater. On the other hand, the intake valve model is designed to calculate the valve-closing inflow air amount based on the intake air pressure Pm and the engine speed NE. The intake valve model is designed so that the higher the intake air pressure Pm, the greater the calculated valve-closing inflow air amount becomes.

A predicted purge rate calculation process M22 is a process of calculating a predicted purge rate Rpe based on the target purge rate Rp, the intake air pressure Pm and the engine speed NE. The predicted purge rate Rpe is a purge rate relating to fluid in the vicinity of the port injection valve 16. That is, when the purge rate is controlled by the purge valve 66, the purge rate of the fluid in the vicinity of the port injection valve 16 does not immediately change but responds after a delay. The predicted purge rate Rpe is a factor to take the response delay into consideration. The response delay time is set based on the intake air pressure Pm and the engine speed NE.

A base injection amount calculation process M30 is a process of calculating a base injection amount Qb, which is a base value of the amount of fuel required to set the air-fuel ratio of the air-fuel mixture in the combustion chamber 24 at the target air-fuel ratio, based on the charging efficiency η. More specifically, in the base injection amount calculation process M30, for example, provided that the charging efficiency η is expressed in percentage, the base injection amount Qb can be calculated by multiplying a fuel amount QTH required to set the air-fuel ratio at the target air-fuel ratio for a charging efficiency η of 1% by the charging efficiency η. The base injection amount Qb is a fuel amount calculated to adjust the air-fuel ratio to the target air-fuel ratio based on the amount of fresh air introduced into the combustion chamber 24. The target air-fuel ratio can be a theoretical air-fuel ratio, for example.

A feedback process M32 is a process of calculating a feedback correction coefficient KAF, which is obtained by adding 1 to a correction ratio δ for the base injection amount Qb, and outputting the feedback correction coefficient KAF. The correction ratio δ for the base injection amount Qb is a feedback manipulation amount that is a manipulation amount for feedback-controlling the air-fuel ratio Af to a target value Af*. More specifically, in the feedback process M32, the correction ratio δ is a sum of output values of a proportional element and a differential element that receive the difference between the air-fuel ratio Af and the target value Af* as an input and an output value of an integral element that retains and outputs a value that depends on the difference between the air-fuel ratio Af and the target value Af*.

An air-fuel ratio learning process M34 is a process of updating an air-fuel ratio learned value LAF stored in the nonvolatile memory 76 so as to reduce the deviation of the feedback correction coefficient KAF with respect to 1 when an air-fuel ratio learning condition, such as that the target purge ratio Rp is zero, is satisfied. The air-fuel ratio learning process M34 includes a process of determining that the air-fuel ratio learned value LAF has converged when the absolute value of the correction ratio δ becomes equal to or less than a predetermined value as a result of the update process for the air-fuel ratio learned value LAF.

A purge concentration learning process M36 is a process of calculating a purge concentration learned value Lp based on the correction ratio δ if it is determined that the air-fuel ratio learned value LAF has converged. The purge concentration learned value Lp is a correction ratio that corrects a deviation of the base injection amount Qb with respect to the injection amount required to adjust the air-fuel ratio to the target air-fuel ratio due to flowing of fuel vapor from the canister 64 into the combustion chamber 24 reduced to a value for a purge rate of 1%. In this embodiment, the fuel vapor flowing from the canister 64 into the combustion chamber 24 is considered as the only cause of the deviation of the feedback correction coefficient KAF from 1 at the time when the target purge rate Rp is controlled to be greater than 0. That is, the correction ratio δ is considered as a correction ratio that corrects the deviation of the base injection amount Qb with respect to the injection amount required to adjust the air-fuel ratio to the target air-fuel ratio due to flowing of fuel vapor from the canister 64 into the intake passage 12. However, the correction ratio δ depends on the purge rate. Thus, in this embodiment, the purge concentration learned value Lp is defined as δ/Rp, which is the correction ratio δ for a purge rate of 1%.

More specifically, the current purge concentration learned value Lp(n) is an exponential moving average of the previous purge concentration learned value Lp(n−1) and the correction ratio δ/Rp for a purge ratio of 1%. FIG. 2 shows weighting factors α and β for the previous purge concentration learned value Lp(n−1) and the value δ/Rp for a purge rate of 1%, respectively. Note that α+β=1.

A purge correction ratio calculation process M38 is a process of calculating a purge correction ratio Dp by multiplying the purge concentration learned value Lp by the predicted purge rate Rpe. The purge correction ratio Dp is a correction ratio required to correct the base injection amount Qb by reducing the base injection amount Qb by the amount of fuel vapor and assumes a negative value.

A reflection rate setting process M40 is a process of receiving the intake air amount Ga as an input and calculating a reflection rate REF having a value that depends on the flow rate of the blow-by gas in the intake passage 12. Since the flow rate of the blow-by gas in the intake passage 12 is higher when the intake air amount Ga is smaller, the reflection rate REF calculated in the reflection rate setting process M40 is greater when the intake air amount Ga is smaller.

A dilution learning process M42 is a process of calculating a dilution concentration learned value Ld based on the correction ratio δ when it is determined that the air-fuel ratio learned value LAF has converged and the target purge rate Rp is zero. The dilution concentration learned value Ld is a correction ratio that corrects a deviation of the base injection amount Qb with respect to the injection amount required to adjust the air-fuel ratio to the target air-fuel ratio due to flowing of fuel vapor from the blow-by gas passage 52 into the combustion chamber 24 reduced to a value for a reflection rate REF of 1%. In this embodiment, the fuel vapor flowing from the blow-by gas passage 52 into the combustion chamber 24 is considered as a cause of the deviation of the feedback correction coefficient KAF from 1 at the time when the target purge rate Rp is 0. That is, the correction ratio δ is considered as a correction ratio that corrects the deviation of the base injection amount Qb with respect to the injection amount required to adjust the air-fuel ratio to the target air-fuel ratio due to flowing of fuel vapor from the blow-by gas passage 52 into the intake passage 12. However, the correction ratio δ depends on the flow rate of the blow-by gas flowing from the blow-by gas passage 52 into the intake passage 12. Thus, in this embodiment, the dilution concentration learned value Ld is defined as δ/REF, which is the correction ratio for a reflection rate REF of 1%.

More specifically, the current dilution concentration learned value Ld(n) is an exponential moving average of the previous dilution concentration learned value Ld(n−1) and the correction ratio δ/REF for a reflection rate REF of 1%.

A dilution correction ratio calculation process M44 is a process of calculating a dilution correction ratio Dd by multiplying the dilution concentration learned value Ld by the reflection rate REF. The dilution correction ratio Dd is a correction ratio required to correct the base injection amount Qb by reducing the base injection amount Qb by the amount of fuel vapor and assumes a negative value.

A fuel reduction coefficient calculation process M46 is a process of outputting, as a fuel reduction coefficient Kd, a sum of the purge correction ratio Dp, the dilution correction ratio Dd and 1.

A multiplication process M48 is a process of calculating a correction coefficient Kc by multiplying the feedback correction coefficient KAF, the air-fuel ratio learned value LAF and the fuel reduction coefficient Kd.

A low temperature correction process M50 is a process of calculating a low-temperature fuel increasing coefficient Kw greater than 1 in order to increase the base injection amount Qb when the coolant temperature THW is lower than a prescribed temperature (70° C., for example). Specifically, a greater low-temperature fuel increasing coefficient Kw is calculated when the coolant temperature THW is lower.

A transient correction process M52 is a process of calculating a transient correction amount ΔQ, which is a feedforward correction amount that prevents the amount of fuel flowing into the combustion chamber 24 from varying with the amount of fuel deposited in the intake passage 12, during a transient period in which the charging efficiency η varies. When the charging efficiency η decreases, the amount of fuel deposited in the intake passage 12 decreases, and therefore the amount of fuel flowing into the combustion chamber 24 becomes excessive with respect to the base injection amount Qb, so that the calculated transient correction amount ΔQ is a negative value. On the other hand, when the charging efficiency η increases, the amount of fuel deposited in the intake passage 12 increases, and therefore the amount of fuel flowing into the combustion chamber 24 becomes insufficient with respect to the base injection amount Qb, so that the calculated transient correction amount ΔQ is a positive value. More specifically, the transient correction process M52 is a process of calculating the transient correction amount ΔQ based on the charging efficiency η, the coolant temperature THW, the engine speed NE and the intake phase difference DIN and on whether a multiple injection process or a single injection process, both described later, is executed. Specifically, the amount of fuel deposited in the intake passage 12 is greater when the coolant temperature THW is lower, the transient correction amount ΔQ has a greater absolute value when the coolant temperature THW is lower. In a steady state, the transient correction amount ΔQ is zero.

An injection valve manipulation process M54 is a process of outputting a manipulation signal MS2 to the port injection valve 16 to manipulate the port injection valve 16 based on the base injection amount Qb, the correction coefficient Kc, the low-temperature fuel increasing coefficient Kw and the transient correction amount ΔQ. More specifically, the injection valve manipulation process M54 is a process of making the port injection valve 16 inject a required injection amount Qd, which is the amount of fuel required to be supplied from the port injection valve 16 to one cylinder in one combustion cycle. The required injection amount Qd is Kc·Kw·Qb+ΔQ.

Figure 3:
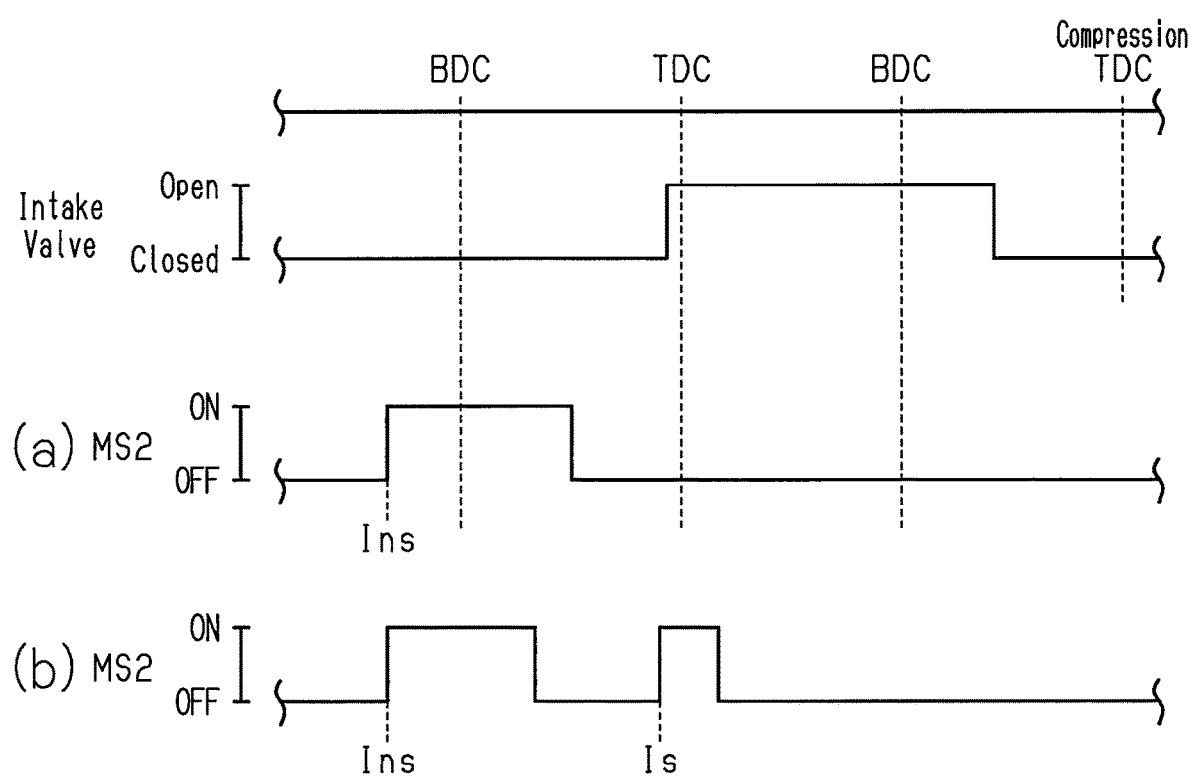
FIG. 3 is a timing diagram in which section (a) show a single injection process in the internal combustion engine shown in FIG. 1, and the section (b) shows a multiple injection process in the internal combustion engine shown in FIG. 1.

In this embodiment, the fuel injection process includes two processes, the process illustrated in section (a) of FIG. 3 and the process illustrated in section (b) of FIG. 3.

Section (a) of FIG. 3 shows a single injection process in which fuel injection is started and ended before the intake valve 18 is opened.

Section (b) of FIG. 3 shows a multiple injection process in which two fuel injections, an intake-synchronous injection and an intake-asynchronous injection, are executed. In the intake-synchronous injection, fuel injection is started at a synchronous injection starting time Is in synchronization with opening of the intake valve 18. In the intake-asynchronous injection, fuel injection is started at an asynchronous injection starting time Ins in advance of the intake-synchronous injection. More specifically, in the intake-synchronous injection, fuel is injected from the port injection valve 16 in such a manner that the period in which the fuel arrives at the position of the intake valve 18 yet to be opened is included in the period in which the intake valve 18 is open. In contrast, in the intake-asynchronous injection, fuel is injected from the port injection valve 16 in such a manner that the period in which the fuel arrives at the position of the intake valve 18 yet to be opened coincides with the period in which the intake valve 18 is closed. The process shown in section (a) of FIG. 3 is a process of performing only the intake-asynchronous injection, and therefore, the injection starting time is denoted as Ins.

In this embodiment, the multiple injection process is executed to reduce PN. That is, when the coolant temperature THW is somewhat low, if the single injection process is executed in a region where the charging efficiency $\eta$ is somewhat high, PN tends to increase. A possible reason for this is that, as the charging efficiency $\eta$ increases, the required injection amount Qd increases, and as a result, the amount of fuel deposited in the intake passage 12 increases. More specifically, it is conjectured that PN increases because, if the amount of fuel deposited in the intake passage 12 increases to some extent, shearing of the deposited fuel occurs, and therefore part of the deposited fuel flows into the combustion chamber 24 in the form of liquid drops. To avoid this, in this embodiment, in the region where the charging efficiency $\eta$ is somewhat high, part of the required injection amount Qd is injected by intake-synchronous injection. Therefore, despite the high required injection amount Qd, the amount of fuel deposited in the intake passage 12 can be reduced, and PN can be reduced.

Figure 4:
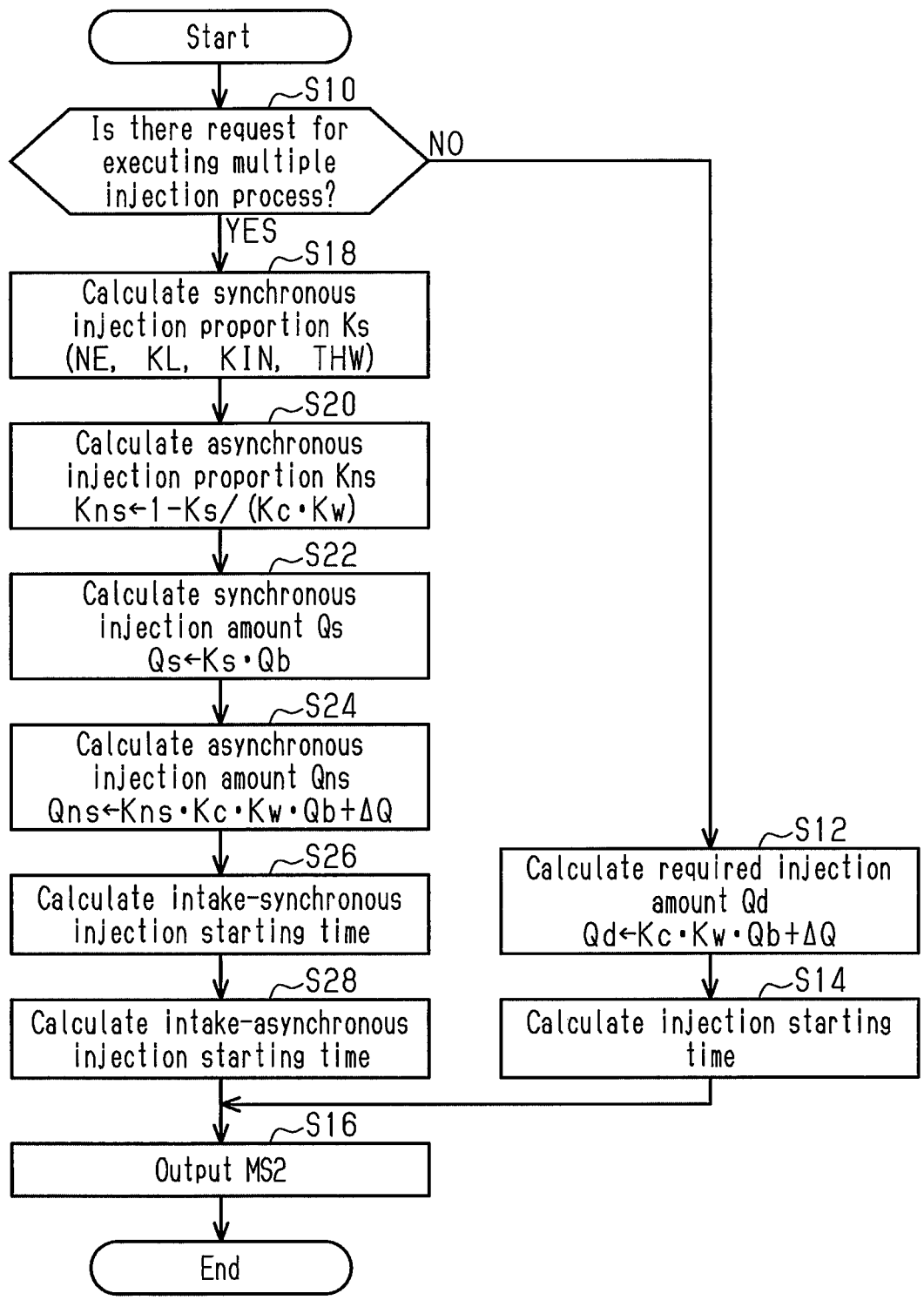
FIG. 4 is a flowchart showing an injection valve manipulation process in the internal combustion engine shown in FIG. 1.

FIG. 4 shows a procedure of the injection valve manipulation process M54. The process shown in FIG. 4 is implemented by the CPU 72 repeatedly executing a program stored in the ROM 74 at predetermined cycles, for example. In the following, numerals with the prefix S denote step numbers in each process.

In the process shown in FIG. 4, the CPU 72 first determines whether or not there is a request for executing the multiple injection process (S10). The CPU 72 determines that there is a request for executing the multiple injection process if the logical conjunction is true of a condition (i) that the charging efficiency $\eta$ is equal to or higher than a predetermined value, a condition (ii) that the charging efficiency $\eta$ is lower than a prescribed value greater than the predetermined value, and a condition (iii) that the coolant temperature THW is equal to or lower than the prescribed temperature described above. In the condition (ii), the higher the engine speed NE, the greater the prescribed value is. Furthermore, the condition (ii) is a condition that a time interval equal to or longer than a predetermined time that depends on the structure of the port injection valve 16 can be ensured between the time when the intake-asynchronous injection is ended and the synchronous injection starting time Is. If the CPU 72 determines that there is no request for executing the multiple injection process (NO in S10), the CPU 72 calculates the required injection amount Qd on the assumption that the single injection process is to be executed (S12). The CPU 72 then calculates the asynchronous injection starting time Ins shown in section (a) of FIG. 3. The CPU 72 then outputs the manipulation signal MS2 to the port injection valve 16, thereby manipulating the port injection valve 16 to inject the required injection amount Qd of fuel at the asynchronous injection starting time Ins (S16).

In contrast, if the CPU 72 determines that there is a request for executing the multiple injection process (YES in S10), the CPU 72 calculates a synchronous injection proportion Ks, which is the proportion of a synchronous injection amount Qs in the base injection amount Qb (S18). The CPU 72 calculates the synchronous injection proportion Ks according to the engine speed NE, the charging efficiency $\eta$, the coolant temperature THW, and the intake phase difference DIN. More specifically, with map data including the engine speed NE, the charging efficiency $\eta$, the coolant temperature THW and the intake phase difference DIN as input variables and the synchronous injection proportion Ks as an output variable stored in the ROM 74 in advance, the CPU 72 calculates the synchronous injection proportion Ks by map operation.

The map data is a data set including discrete values of an input variable and values of an output variable corresponding to the values of the input variable. The map operation can be an operation in which if the value of a relevant input variable agrees with any of the values of the input variable in the map data, the corresponding value of the output variable in the map data is adopted as an operation result, and if the value of the relevant input variable does not agree with any of the values of the input variable in the map data, a value obtained by interpolation of a plurality of values of the output variable in the map data is adopted as an operation result.

The CPU 72 then calculates an asynchronous injection proportion Kns, which is a proportion of an asynchronous injection amount Qns with respect to the required injection amount Qd minus the transient correction amount $\Delta Q$ (S20). More specifically, the CPU 72 calculates the asynchronous injection proportion Kns by subtracting Ks/(Kc·Kw) from 1. The CPU 72 then substitutes the base injection amount Qb multiplied by the synchronous injection proportion Ks into the synchronous injection amount Qs (S22). The CPU 72 then substitutes the sum of the transient correction amount $\Delta Q$ and Kc·Kw·Qb, which is the required injection amount Qd minus the transient correction amount $\Delta Q$, multiplied by the asynchronous injection proportion Kns into the asynchronous injection amount Qns (S24).

Thus, the asynchronous injection amount Qns assumes the following value.

$$Kns \cdot Kc \cdot Kw \cdot Qb + \Delta Q = Kc \cdot Kw \cdot Qb - Ks \cdot Qb + \Delta Q$$

Therefore, the sum of the asynchronous injection amount Qns and the synchronous injection amount Qs is Kc·Kw·Qb+$\Delta Q$, which is equal to the required injection amount Qd.

The CPU 72 then calculates the synchronous injection starting time Is based on the engine speed NE, the charging efficiency $\eta$, the coolant temperature THW and the intake phase difference DIN (S26). More specifically, the CPU 72 first calculates an arrival end time, which is a target value of the end point of the period in which the fuel injected from the port injection valve 16 arrives at the position of the intake valve 18 in the period in which the valve is closed, based on the engine speed NE, the charging efficiency $\eta$, the coolant temperature THW and the intake phase difference DIN. The end point of the period means a time when the part of the fuel that is injected from the port injection valve 16 at the latest timing arrives at the position of the intake valve 18 in the period in which the valve is closed. The CPU 72 then calculates the synchronous injection starting time Is based on the arrival end time, the synchronous injection amount Qs and the engine speed NE. The greater the synchronous injection amount Qs, the more advanced the calculated synchronous injection starting time Is is. Furthermore, the higher the engine speed NE, the more advanced the synchronous injection starting time Is calculated by the CPU 72 is. The CPU 72 then calculates the asynchronous injection starting time Ins based on the synchronous injection starting time Is (S28). The time interval between the injection ending time of the intake-asynchronous injection and the synchronous injection starting time Is is set to be equal to or longer than the predetermined time described above.

Through the process described above, the synchronous injection starting time Is is set independently of the asynchronous injection starting time Ins. A reason for this is that the arrival end time of the intake-synchronous injection is particularly easily affected by PN of the exhaust gas or HC in the exhaust gas.

Figure 5A:
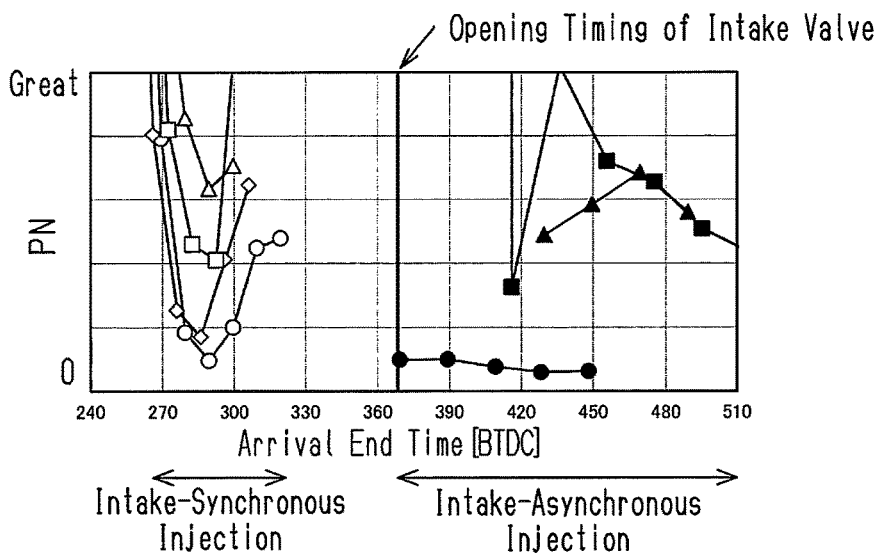
FIG. 5A is a diagram for illustrating a method of setting an arrival end time in the internal combustion engine shown in FIG. 1.
Figure 5B:
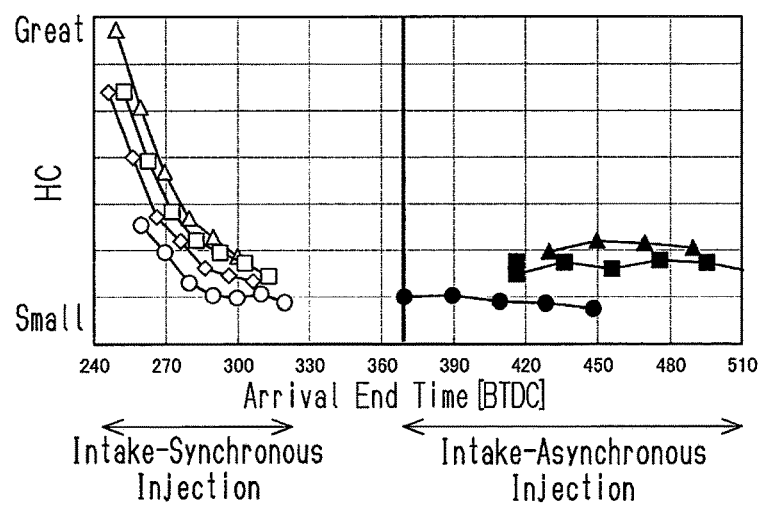
FIG. 5B is a diagram for illustrating the method of setting an arrival end time in the internal combustion engine shown in FIG. 1.

FIG. 5A shows PN in the case where the arrival end time is changed in the intake-asynchronous injection and the intake-synchronous injection, and FIG. 5B shows the amount of generated HC in the case where the arrival end time is changed in the intake-asynchronous injection and the intake-synchronous injection. In these drawings, hollow dots represent a case where the arrival end time of the intake-asynchronous injection is fixed and the arrival end time of the intake-synchronous injection is changed. Solid dots represent a case where the arrival end time of the intake-synchronous injection is fixed and the arrival end time of the intake-asynchronous injection is changed. Circular dots, diamond-shaped dots, square dots and triangular dots correspond to ratios of the asynchronous injection amount Qns to the synchronous injection amount Qs of 8:2, 7:3, 6:4, and 5:5, respectively.

As shown by the hollow dots in FIGS. 5A and 5B, PN and the amount of generated HC largely vary as the arrival end time of the intake-synchronous injection varies. Thus, in this embodiment, the arrival end time of the intake-synchronous injection is set at an adequate value that can reduce PN and the amount of generated HC.

Referring back to FIG. 4, the CPU 72 outputs the manipulation signal MS2 to the port injection valve 16 to manipulate the port injection valve 16 to inject the synchronous injection amount Qs of fuel at the synchronous injection starting time Is and inject the asynchronous injection amount Qns of fuel at the asynchronous injection starting time Ins (S16).

Figure 7:
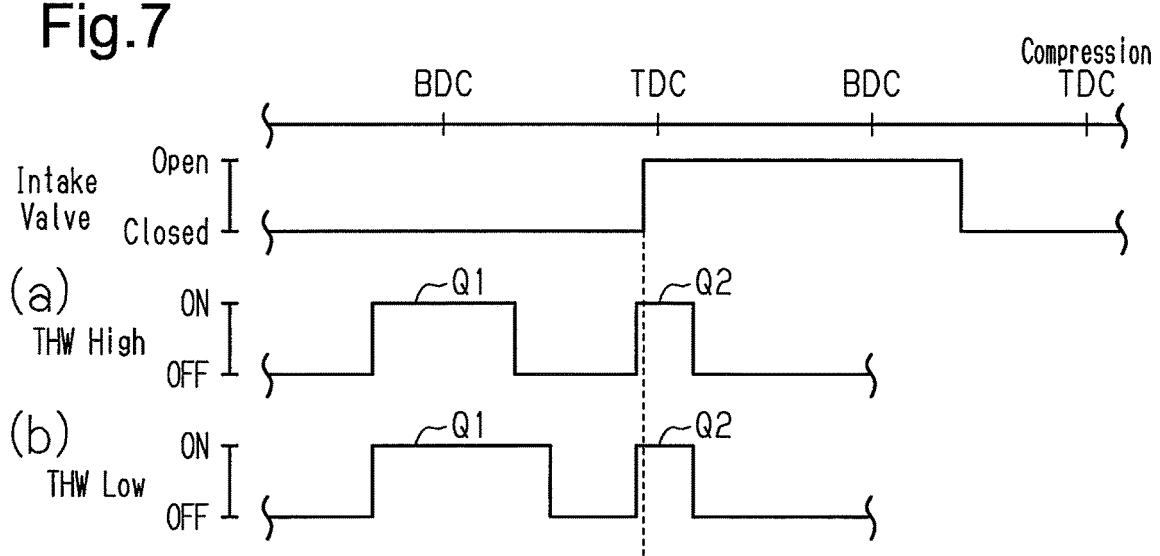
FIG. 7 is a timing diagram in which sections (a) and (b) illustrate effects in the internal combustion engine shown in FIG. 1.

When the processing of S16 is completed, the CPU 72 ends the process shown in FIG. 7.

An operation and advantages of the present embodiment will now be described.

The CPU 72 calculates the synchronous injection amount Qs by multiplying the synchronous injection proportion Ks by the base injection amount Qb. Therefore, the synchronous injection amount Qs does not vary with the correction coefficient Kc, the low-temperature fuel increasing coefficient Kw or the transient correction amount $\Delta Q$.

Figure 6A:
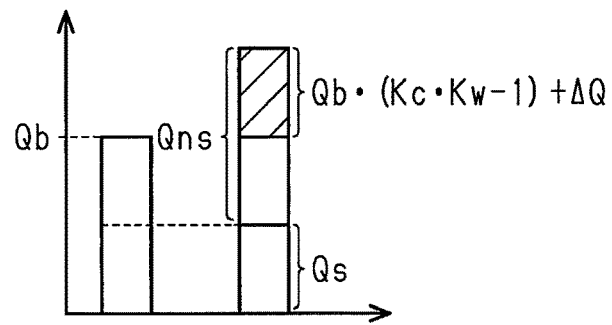
FIG. 6A is a diagram for illustrating an effect in the internal combustion engine shown in FIG. 1.

FIG. 6A shows the synchronous injection amount Qs and the asynchronous injection amount Qns according to this embodiment. As shown in FIG. 6A, in this embodiment, a correction amount $Qb \cdot (Kc \cdot Kw - 1) + \Delta Q$ for the base injection amount Qb is completely included in the asynchronous injection amount Qns regardless of the value thereof. Therefore, the value of the synchronous injection amount Qs does not vary with the correction amount $Qb \cdot (Kc \cdot Kw - 1) + \Delta Q$. Therefore, the synchronous injection amount Qs can be easily set at a value for reducing PN.

Figure 6B:
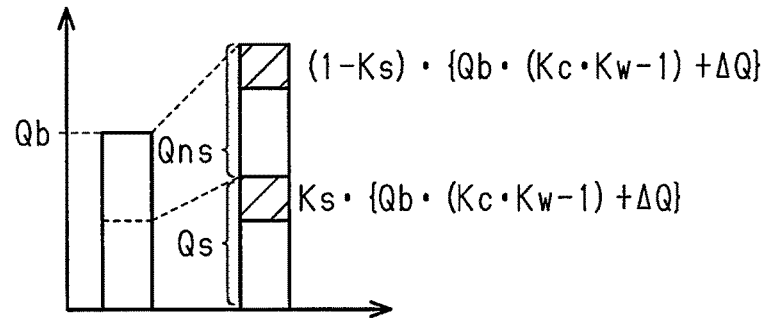
FIG. 6B is a diagram for illustrating an effect in the internal combustion engine shown in FIG. 1.

As a comparative example of this embodiment, FIG. 6B shows a case where the synchronous injection proportion Ks is a proportion in the required injection amount Qd. In this case, the synchronous injection amount Qs is corrected by a part of the correction amount $Qb \cdot (Kc \cdot Kw - 1) + \Delta Q$ that corresponds to the synchronous injection proportion Ks.

Figure 8:
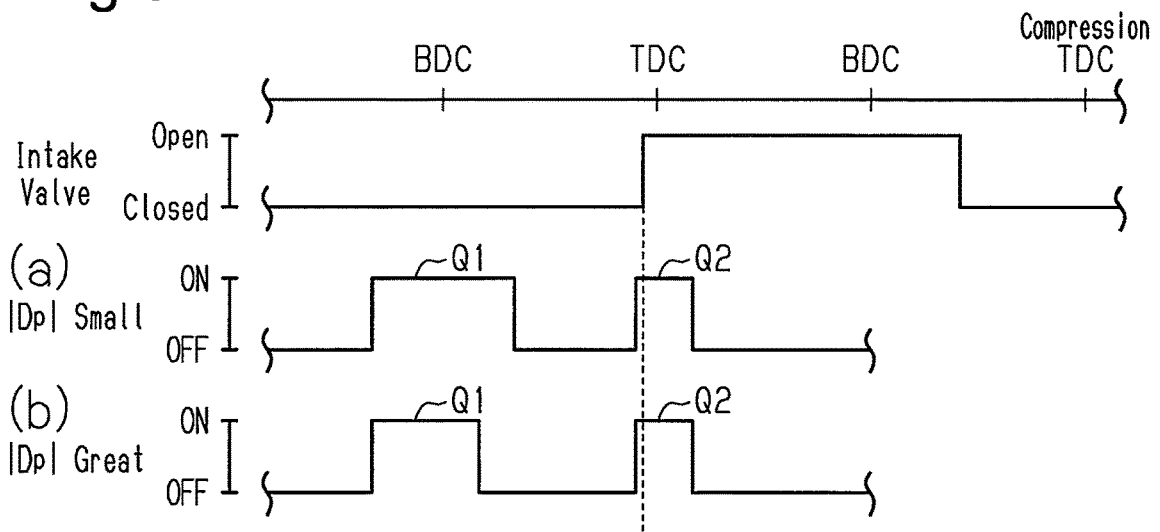
FIG. 8 is a timing diagram in which section (a) and (b) illustrate effects in the internal combustion engine shown in FIG. 1.

According to this embodiment, the CPU 72 increases the asynchronous injection amount Qns that is the injection amount in an intake-asynchronous injection Q1 in the case where the coolant temperature THW is lower shown in section (b) of FIG. 7 according to the low-temperature fuel increasing coefficient Kw compared with the case where the coolant temperature THW is higher shown in section (a) of FIG. 7. The CPU 72 reduces the asynchronous injection amount Qns that is the injection amount in the intake-asynchronous injection Q1 according to the purge correction ratio Dp in the case where the absolute value of the purge correction ratio Dp is greater shown in section (b) of FIG. 8 compared with the case where the absolute value of the purge correction ratio Dp is smaller shown in section (a) of FIG. 8. Furthermore, the CPU 72 changes the asynchronous injection amount Qns that is the injection amount in the intake-asynchronous injection Q1 according to the transient correction amount $\Delta Q$ in a transient period in which the charging efficiency $\eta$ largely changes, unlike in the steady state. In particular, the absolute value of the variation of the asynchronous injection amount Qns is greater when the coolant temperature THW is low than when the coolant temperature THW is high.

<Correspondence>

The correspondence between the items in the above-described embodiments and the items described in the above SUMMARY is as follows. Below, the correspondence is shown for each of the numbers in the examples described in the above SUMMARY.

[1] The division process corresponds to the processing of S18. The required correction amount corresponds to the feedback correction coefficient KAF, the purge correction ratio Dp, the dilution correction ratio Dd, the air-fuel ratio learned value LAF and the transient correction amount $\Delta Q$.

The required correction amount outputting process corresponds to the purge correction ratio calculation process M38, the dilution correction ratio calculation process M44, the fuel reduction coefficient calculation process M46, the feedback process M32, the air-fuel ratio learning process M34, the multiplication process M48, the low-temperature correction process M50, and the transient correction process M52.

The selective correction process corresponds to the processing of S20 and S24. The manipulation process corresponds to the processing of S16 following the processing of S28.

[2] Example 2 corresponds to the purge correction ratio calculation process M38, the dilution correction ratio calculation process M44 and the fuel reduction coefficient calculation process M46.

[3] The adjusting device corresponds to the purge valve 66, and the flow rate control process corresponds to the target purge rate calculation process M16 and the purge valve operation process M18.

The vapor ratio corresponds to the purge correction ratio Dp. The purge correction ratio Dp and the vapor ratio are not the same but have a one-to-one correspondence, so that a request for correction according to the purge correction ratio Dp can be regarded as a request for correction according to the ratio of vapor from the canister.

[7] and [16] The required injection amount setting process corresponds to the base injection amount calculation process M30, the purge correction ratio calculation process M38, the dilution correction ratio calculation process M44, the fuel reduction coefficient calculation process M46, the feedback process M32, the air-fuel ratio learning process M34, the multiplication process M48, the low-temperature correction process M50 and the transient correction process M52. That is, the required injection amount is Kc·Kw·Qb+ΔQ, which can be regarded as being set by calculating the base injection amount Qb, the correction coefficient Kc, the low-temperature fuel increasing coefficient Kw and the transient correction amount ΔQ.

The manipulation process corresponds to the processing of S16 following the processing of S28, and the processing of S24. The manipulation process also corresponds to the process shown in FIG. 7.

[8] and [9] Examples 8 and 9 corresponds to the process shown in FIG. 8. The vapor ratio corresponds to the purge correction ratio Dp. The purge correction ratio Dp and the ratio of vapor from the canister are not the same but have a one-to-one correspondence.

[17] The required injection amount setting process corresponds to the base injection amount calculation process M30, the purge correction ratio calculation process M38, the dilution correction ratio calculation process M44, the fuel reduction coefficient calculation process M46, the feedback process M32, the air-fuel ratio learning process M34, the multiplication process M48, the low-temperature correction process M50 and the transient correction process M52. That is, the required injection amount is Kc·Kw·Qb+ΔQ, which can be regarded as being set by calculating the base injection amount Qb, the correction coefficient Kc, the low-temperature fuel increasing coefficient Kw and the transient correction amount ΔQ.

The manipulation process corresponds to the processing of S16 following the processing of S28, and the processing of S24. The manipulation process also corresponds to the process shown in FIG. 8.

[10] and [18] The required injection amount setting process corresponds to the base injection amount calculation process M30, the purge correction ratio calculation process M38, the dilution correction ratio calculation process M44, the fuel reduction coefficient calculation process M46, the feedback process M32, the air-fuel ratio learning process M34, the multiplication process M48, the low-temperature correction process M50, and the transient correction process M52. That is, the required injection amount is Kc·Kw·Qb+ΔQ, which can be regarded as being set by calculating the base injection amount Qb, the correction coefficient Kc, the low-temperature fuel increasing coefficient Kw and the transient correction amount ΔQ. The manipulation process corresponds to the processing of S16 following the processing of S28, and the processing of S24. The manipulation process also corresponds to the process shown in FIG. 9.

Other Embodiments

The present embodiment may be modified as follows. The present embodiment and the following modifications can be combined as long as the combined modifications remain technically consistent with each other.

Regarding Required Correction Amount Outputting Process

In the embodiment described above, required correction amounts for the base injection amount Qb are the purge correction ratio Dp, the dilution correction ratio Dd, the feedback correction coefficient KAF, the air-fuel ratio learned value LAF, the low-temperature fuel increasing coefficient Kw and the transient correction amount ΔQ. However, the present invention is not limited to these required correction amounts. For example, only five or four of these six parameters may be used as required correction amounts. Alternatively, only three of these parameters may be used as required correction amounts. Alternatively, only two of these parameters may be used as required correction amounts. Alternatively, only one of these parameters may be used as a required correction amount.

Regarding Intake-Asynchronous Injection

In the embodiment described above, the intake-asynchronous injection involves injecting fuel in such a manner that the period in which the fuel injected from the port injection valve 16 arrives at the position of the intake valve 18 yet to be opened coincides with the period in which the intake valve 18 is closed. However, the present invention is not limited to this implementation. For example, if the asynchronous injection amount Qns is excessively high, a part of the period in which the fuel injected from the port injection valve 16 arrives at the position of the intake valve 18 yet to be opened may overlap with the period in which the intake valve 18 is open.

Regarding Intake-Synchronous Injection

In the embodiment described above, the arrival end time is set based on the engine speed NE, the charging efficiency η, the coolant temperature THW and the intake phase difference DIN. However, the present invention is not limited to this implementation. For example, the synchronous injection starting time Is may be set based on the engine speed NE, the charging efficiency η, the coolant temperature THW and the intake phase difference DIN. Furthermore, as a parameter of load, the base injection amount Qb may be used instead of the charging efficiency η, for example. Furthermore, with regard to the four parameters, that is, the engine speed NE, the load, the coolant temperature THW and the intake phase difference DIN, the arrival end time or the synchronous injection starting time Is may be variably set based on only three, two or one of the four parameters.

Regarding Single Injection Process

In the embodiment described above, the single injection process is defined as completing injection of all fuel before the intake valve 18 is opened. However, the present invention is not limited to this implementation. For example, if the required injection amount Qd is high, the time of ending the injection may lag behind the time of opening the intake valve 18. Note that to perform the single injection process is not essential.

Regarding Method of Dividing Required Injection Amount

In the embodiment described above, the synchronous injection proportion Ks, which indicates the proportion of the synchronous injection amount Qs in the base injection amount Qb, is variably set based on the engine speed NE, the charging efficiency η, the coolant temperature THW, and the intake phase difference DIN. However, the present invention is not limited to this implementation. For example, as a load parameter, which is a parameter of the amount of fresh air introduced into the combustion chamber 24, the required injection amount Qd may be used instead of the charging efficiency η. Furthermore, with regard to the four parameters, that is, the load parameter, the engine speed NE, the coolant temperature THW and the intake phase difference DIN, the synchronous injection proportion Ks may be variably set based on only three, two or one of the four parameters. In such cases, at least one of the load parameter and the coolant temperature THW is desirably used to variably set the synchronous injection proportion Ks. Other parameters than the four parameters described above, such as the intake air pressure or the flow velocity of the intake air, may also be used. However, the intake air pressure and the flow velocity of the intake air can be grasped based on the four parameters described above.

The asynchronous injection proportion Kns does not necessarily need to be the amount that indicates the proportion of the asynchronous injection amount Qns in the required injection amount minus the transient correction amount ΔQ. For example, the asynchronous injection proportion Kns may be an amount that indicates the proportion of the asynchronous injection amount Qns in the base injection amount Qb. In that case, a relation Kns+Ks=1 holds. In that case, the final asynchronous injection amount Qns can be Qb·Kns+Qb·(Kc·Kw−1)+ΔQ.

To determine the synchronous injection proportion Ks is not essential. For example, in the embodiment described above or a modification thereof, the synchronous injection amount Qs may be calculated based on a parameter that determines the synchronous injection proportion Ks. In that case, the asynchronous injection amount Qns can be Qb·Kc·Kw+ΔQ−Qs.

Regarding Disturbing Fuel Ratio and Vapor Ratio

For example, the purge concentration learned value Lp or the dilution concentration learned value Ld does not necessarily need to be calculated, and at least one of the purge passage 68 and the blow-by gas passage 52 may be provided with a flow rate sensor and an HC sensor. Based on the detection values of the pair of sensors, the flow rate of fuel vapor can be calculated, and based on the calculated flow rate of fuel vapor, the ratio of the amount of fuel vapor to the amount of the fuel flowing into the combustion chamber 24 can be calculated. In that case, again, the fuel reducing correction coefficient, the fuel reducing correction ratio and the fuel reducing correction amount for the base injection amount Qb can be calculated based on the ratio of fuel vapor.

Regarding Manipulation Process

FIG. 7 illustrates a case where the fuel increasing rate of the asynchronous injection amount Qns in the case where the coolant temperature THW is lower with respect to the case where the coolant temperature THW is higher is greater than zero, and the fuel increasing rate of the synchronous injection amount Qs is zero. However, the present invention is not limited to this implementation. For example, only 1% of the fuel increment (Kw−1)·Kc·Qb according to the low-temperature fuel increasing coefficient Kw may be allocated to the synchronous injection amount Qs.

FIG. 8 illustrates a case where the fuel reducing rate of the asynchronous injection amount Qns in the case where the ratio of the fuel vapor flowing from the canister 64 into the combustion chamber 24 is greater with respect to the case where the ratio is smaller is greater than zero, and the fuel reducing rate of the synchronous injection amount Qs is zero. However, the present invention is not limited to this implementation. For example, only 1% of the purge correction ratio Dp may be allocated to the synchronous injection amount Qs.

Figure 9:
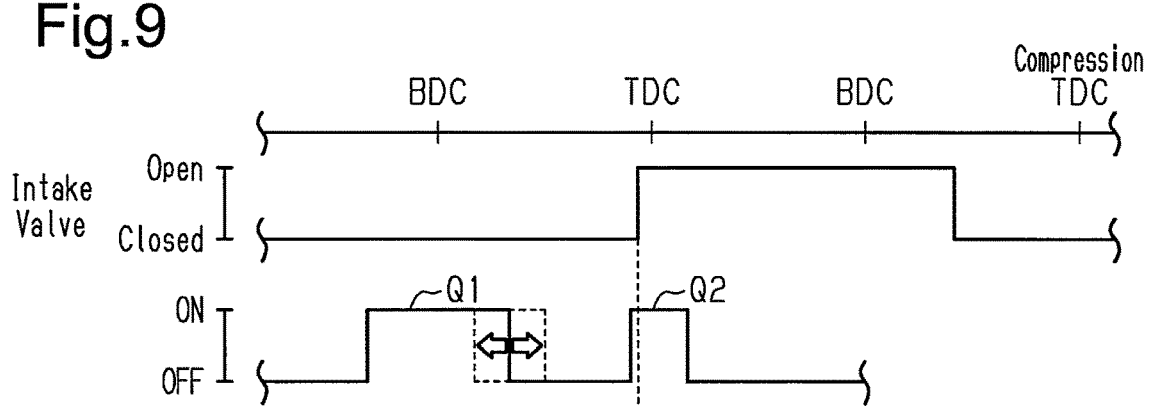
FIG. 9 is a timing diagram for illustrating an effect in the internal combustion engine shown in FIG. 1.

In FIG. 9, the absolute value of the correction ratio for the asynchronous injection amount Qns in the transient state with respect to the steady state is greater than zero, and the absolute value of the correction ratio for the synchronous injection amount Qs is zero. However, the present invention is not limited to this implementation. For example, only 1% of the transient correction amount ΔQ may be allocated to the synchronous injection amount Qs.

Regarding Purge Control Process

In the embodiment described above, the target purge rate Rp is variably set according to the charging efficiency η. However, the parameter for variably setting the target purge rate Rp is not limited to the charging efficiency η. Alternatively, the target purge rate Rp may be a fixed value. Alternatively, the opening of the purge valve 66 may be controlled in binary, such as fully-closed and a predetermined opening.

Regarding Adjusting Device

The adjusting device that adjusts the flow rate of the fluid from the canister to the intake passage is not limited to the purge valve 66. For example, the adjusting device may be provided with a pump that sucks in the fluid from the canister 64 and discharges the fluid into the intake passage 12. The arrangement including a pump is particularly advantageous when the internal combustion engine 10 is provided with a supercharger.

Regarding Variable Actuation Device for Intake Valve

The variable actuation device that modifies the actuation of the intake valve 18 is not limited to the intake valve timing adjusting device 44. For example, a device that modified the lift of the intake valve 18 may be used. In that case, the parameter that indicates the valve actuation of the intake valve 18 is the lift or the like, instead of the intake phase difference DIN.

Regarding Controller

The controller is not limited to a device that includes the CPU 72 and the ROM 74 and executes software processing. For example, at least part of the processes executed by the software in the above-described embodiments may be executed by hardware circuits dedicated to execution of these processes (such as ASIC). That is, the controller may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Other Modifications

The internal combustion engine 10 does not necessarily need to include the variable actuation device that modifies the actuation of the intake valve 18. The internal combustion engine 10 does not necessarily need to include the throttle valve 14.

A fuel injection controller for an internal combustion engine according to a second embodiment of the present disclosure will now be described with reference to FIGS. 10 to 16.

Figure 10:
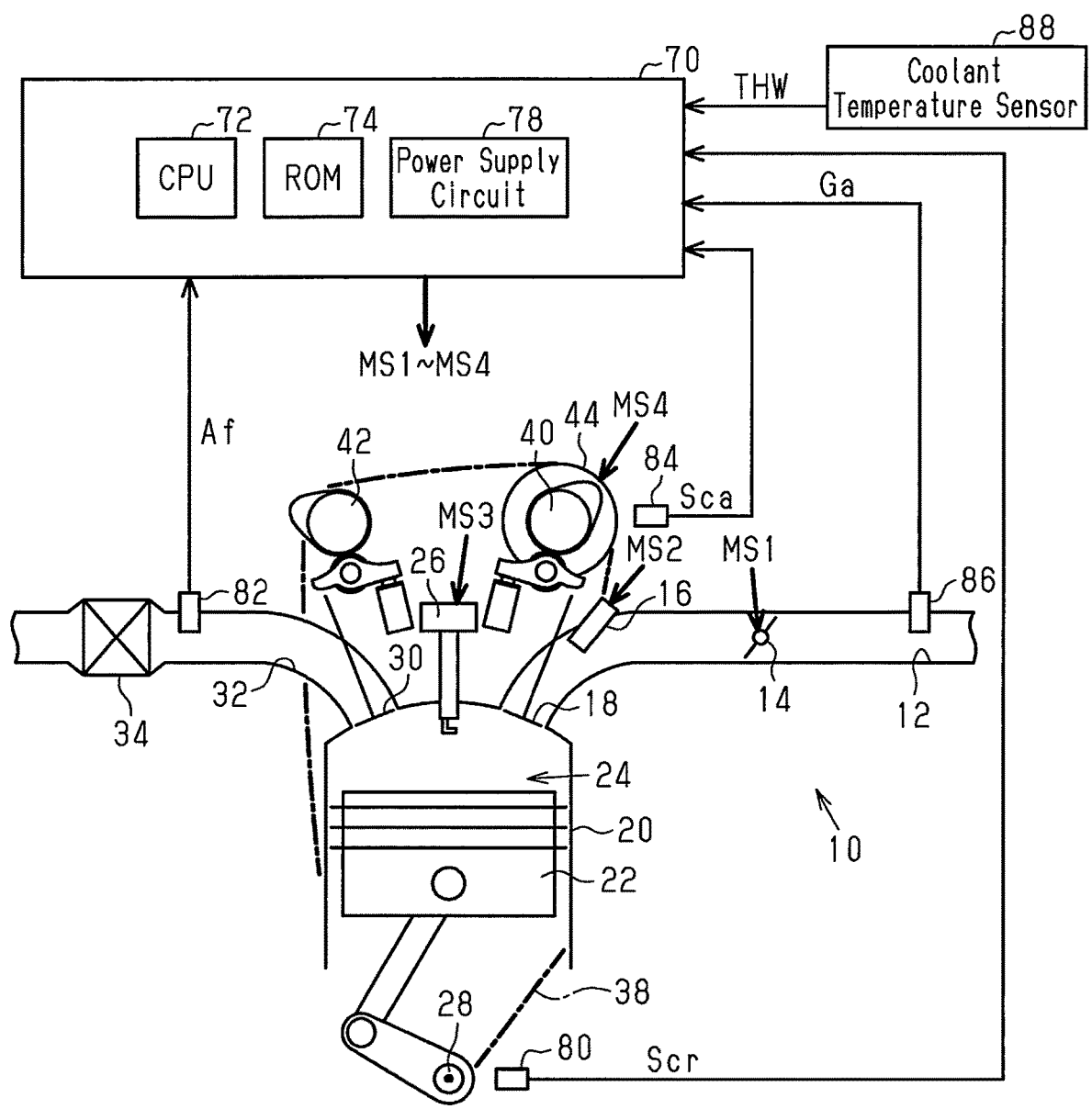
FIG. 10 is a diagram showing a controller according to a second embodiment of the present disclosure and an internal combustion engine.

In an internal combustion engine 10 shown in FIG. 10, a throttle valve 14 is arranged in an intake passage 12, and a port injection valve 16 is arranged downstream of the throttle valve 14. Air taken into the intake passage 12 and fuel injected from the port injection valve 16 flow into a combustion chamber 24, which is defined by a cylinder 20 and a piston 22, when an intake valve 18 opens. In the combustion chamber 24, the air-fuel mixture is burned by a spark discharge from an ignition device 26, and the combustion energy thus generated is converted into a rotational energy for a crankshaft 28 via the piston 22. The burnt air-fuel mixture is discharged to an exhaust passage 32 as an exhaust gas when an exhaust valve 30 opens. A catalyst 34 is provided in the exhaust passage 32.

A rotational motive power of the crankshaft 28 is transmitted to an intake camshaft 40 and an exhaust camshaft 42 via a timing chain 38. In this embodiment, the motive power is transmitted from the timing chain 38 to the intake camshaft 40 via an intake valve timing adjusting device 44. The intake valve timing adjusting device 44 is an actuator that adjusts the timing of opening of the intake valve 18 by adjusting the rotational phase difference between the crankshaft 28 and the intake camshaft 40.

A controller 70 is intended to control the internal combustion engine 10. To control controlled amounts (torque, proportions of constituents of exhaust gas or the like) of the internal combustion engine 10, the controller 70 controls manipulating parts of the internal combustion engine 10, such as the throttle valve 14, the port injection valve 16, the ignition device 26, and the intake valve timing adjusting device 44. To this end, the controller 70 refers to an output signal Scr of a crank angle sensor 80, an intake air amount Ga detected by an air flow meter 86, an air-fuel ratio Af detected by an air-fuel ratio sensor 82, an output signal Sca of an intake cam angle sensor 84, and a temperature (coolant temperature THW) of coolant of the internal combustion engine 10 detected by a coolant temperature sensor 88. FIG. 10 shows a manipulation signal MS1 for manipulating the throttle valve 14, a manipulation signal MS2 for manipulating the port injection valve 16, a manipulation signal MS3 for manipulating the ignition device 26, and a manipulation signal MS4 for manipulating the intake valve timing adjusting device 44.

The controller 70 includes a CPU 72, a ROM 74, and a power supply circuit 78. The controller 70 controls the controlled amounts described above by the CPU 72 executing a program stored in the ROM 74. The power supply circuit 78 supplies electric power to each part of the controller 70.

Figure 11:
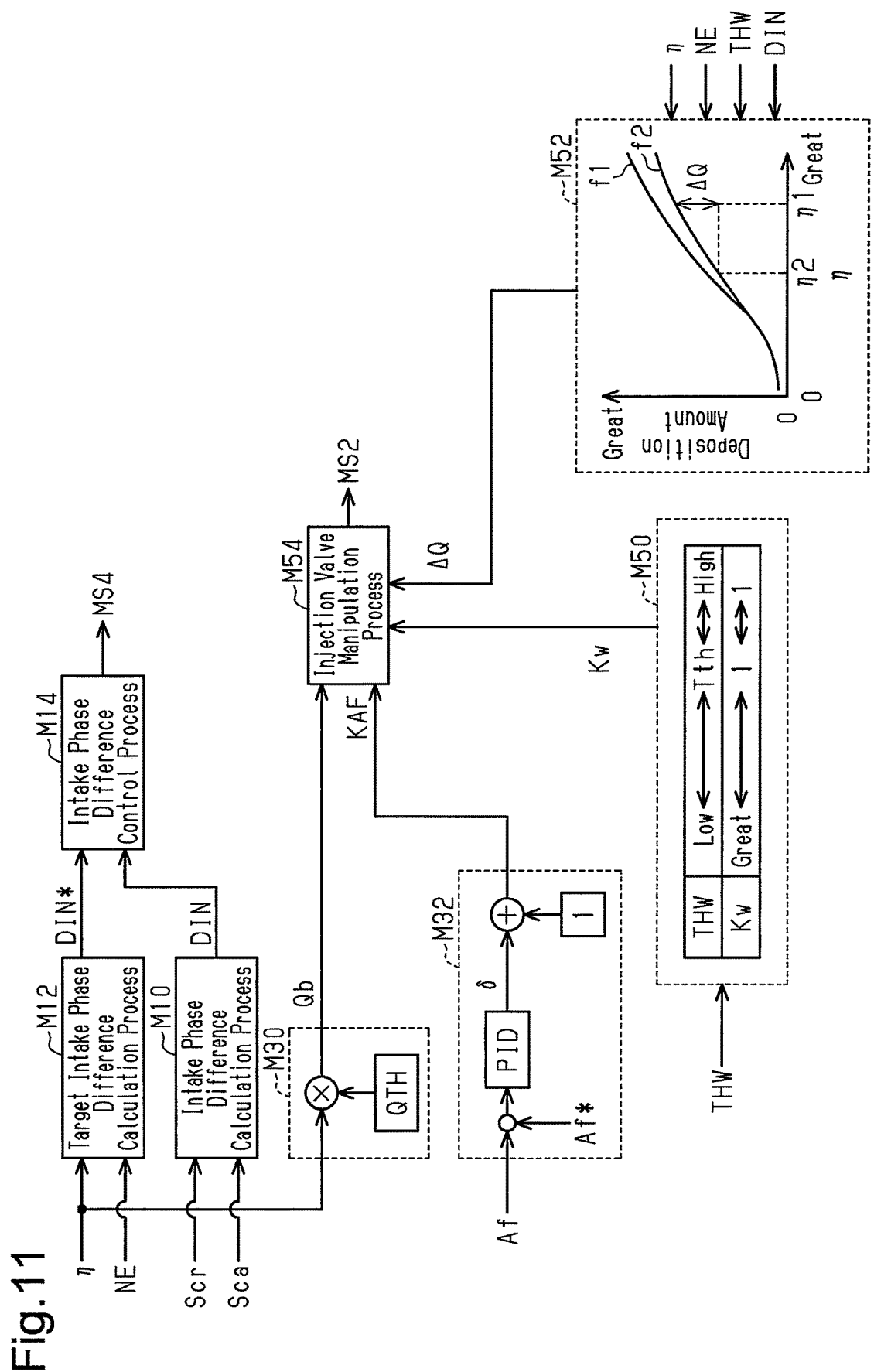
FIG. 11 is a block diagram showing processes executed by the controller in the internal combustion engine shown in FIG. 10.

FIG. 11 shows some of processes executed by the controller 70. The processes shown in FIG. 11 are implemented by the CPU 72 executing a program stored in the ROM 74.

An intake phase difference calculation process M10 is a process of calculating an intake phase difference DIN, which is a phase difference between a rotational angle of the crankshaft 28 and a rotational angle of the intake camshaft 40, based on an output signal Scr of the crank angle sensor 80 and the output signal Sca of the intake cam angle sensor 84. A target intake phase difference calculation process M12 is a process of variably setting a target intake phase difference DIN* based on an operating point of the internal combustion engine 10. In this embodiment, the operating point is defined by an engine speed NE and a charging efficiency η. The CPU 72 calculates the engine speed NE based on the output signal Scr of the crank angle sensor 80, and calculates the charging efficiency η based on the engine speed NE and the intake air amount Ga. The charging efficiency η is a parameter that determines the amount of the fresh air introduced into the combustion chamber 24.

An intake phase difference control process M14 is a process of outputting a manipulation signal MS4 to manipulate the intake valve timing adjusting device 44 to adjust the intake phase difference DIN to the target intake phase difference DIN*.

A base injection amount calculation process M30 is a process of calculating a base injection amount Qb based on the charging efficiency η. The base injection amount Qb is a base value of the amount of fuel required to set the air-fuel ratio of the air-fuel mixture in the combustion chamber 24 at the target air-fuel ratio. More specifically, provided that the charging efficiency η is expressed in percentage, for example, the base injection amount calculation process M30 can be a process of calculating the base injection amount Qb by multiplying a fuel amount QTH for a charging efficiency η of 1% required to set the air-fuel ratio at the target air-fuel ratio by the charging efficiency η. The base injection amount Qb is a fuel amount calculated to adjust the air-fuel ratio to the target air-fuel ratio based on the amount of fresh air introduced into the combustion chamber 24. The target air-fuel ratio can be a theoretical air-fuel ratio, for example.

A feedback process M32 is a process of calculating a feedback correction coefficient KAF, which is obtained by adding 1 to a correction ratio δ for the base injection amount Qb, and outputting the feedback correction coefficient KAF. The correction ratio δ for the base injection amount Qb is a feedback manipulation amount that is a manipulation amount for feedback-controlling the air-fuel ratio Af to a target value Af*. More specifically, in the feedback process M32, the correction ratio δ is a sum of output values of a proportional element and a differential element that receive the difference between the air-fuel ratio Af and the target value Af* as an input and an output value of an integral element that retains and outputs an integrated value of a value that depends on the difference between the air-fuel ratio Af and the target value Af*.

A low temperature correction process M50 is a process of calculating a low-temperature fuel increasing coefficient Kw greater than 1 in order to increase the base injection amount Qb when the coolant temperature THW is lower than a prescribed temperature Tth (70° C., for example). Specifically, a greater low-temperature fuel increasing coefficient Kw is calculated when the coolant temperature THW is lower. When the coolant temperature THW is equal to or higher than the prescribed temperature Tth, the low-temperature fuel increasing coefficient Kw is set at 1, and the amount of correction of the base injection amount Qb by the low-temperature fuel increasing coefficient Kw is zero.

A transient correction process M52 is a process of calculating a transient correction amount ΔQ, during a transient period in which the amount of fuel deposited in the intake passage 12 varies. That is, the transient correction amount ΔQ is a feedforward control manipulation amount that prevents the amount of fuel flowing into the combustion chamber 24 from being excessive or insufficient during the transient period in which the amount of fuel deposited in the intake passage 12 varies. The transient correction process M52 includes a process of calculating the transient correction amount ΔQ to be a negative value when the charging efficiency η decreases, for example. That is, when the charging efficiency η decreases, the amount of fuel deposited in the intake passage 12 transiently decreases, and the amount of the fuel flowing into the combustion chamber 24 can become excessive with respect to the base injection amount Qb because of addition of the decrement of the amount of fuel deposited in the intake passage 12. For this reason, the transient correction process M52 calculates the transient correction amount ΔQ to be a negative value. Furthermore, the transient correction process M52 includes a process of calculating the transient correction amount ΔQ to be a positive value when the charging efficiency η increases, for example. That is, when the charging efficiency η increases, the amount of fuel deposited in the intake passage 12 transiently increases, so that the amount of the fuel flowing into the combustion chamber 24 can become insufficient with respect to the base injection amount Qb because of the increment of the amount of fuel deposited in the intake passage 12. For this reason, the transient correction process M52 calculates the transient correction amount ΔQ to be a positive value. Specifically, the transient correction process M52 is a process of calculating the transient correction amount ΔQ based on the charging efficiency η, the coolant temperature THW, the engine speed NE and the intake phase difference DIN and on whether a multiple injection process or a single injection process, both described later, is executed. In a steady state, the transient correction amount ΔQ is zero.

FIG. 11 schematically shows a curve f2 that represents a relationship between the charging efficiency η and the amount of deposition in the case of the multiple injection process and a curve f1 that represents a relationship between the charging efficiency η and the amount of deposition in the case of the single injection process. FIG. 11 further schematically shows that the variation of the amount of deposition is ΔQ when the charging efficiency η changes from η1 to η2 in the case of the multiple injection process. However, in this embodiment, if the charging efficiency decreases from η1 to η2 in one combustion cycle, for example, only in the subsequent combustion cycle, the transient correction amount ΔQ is not set at the value schematically shown in FIG. 11 and is set at a value other than 0 for a predetermined period.

An injection valve manipulation process M54 is a process of outputting a manipulation signal MS2 to the port injection valve 16 to manipulate the port injection valve 16 based on the base injection amount Qb, the feedback correction coefficient KAF, the low-temperature fuel increasing coefficient Kw and the transient correction amount ΔQ. More specifically, the injection valve manipulation process M54 is a process of making the port injection valve 16 inject a required injection amount Qd, which is the amount of fuel required to be supplied from the port injection valve 16 to one cylinder in one combustion cycle. The required injection amount Qd is KAF·Kw·Qb+ΔQ.

Figure 12:
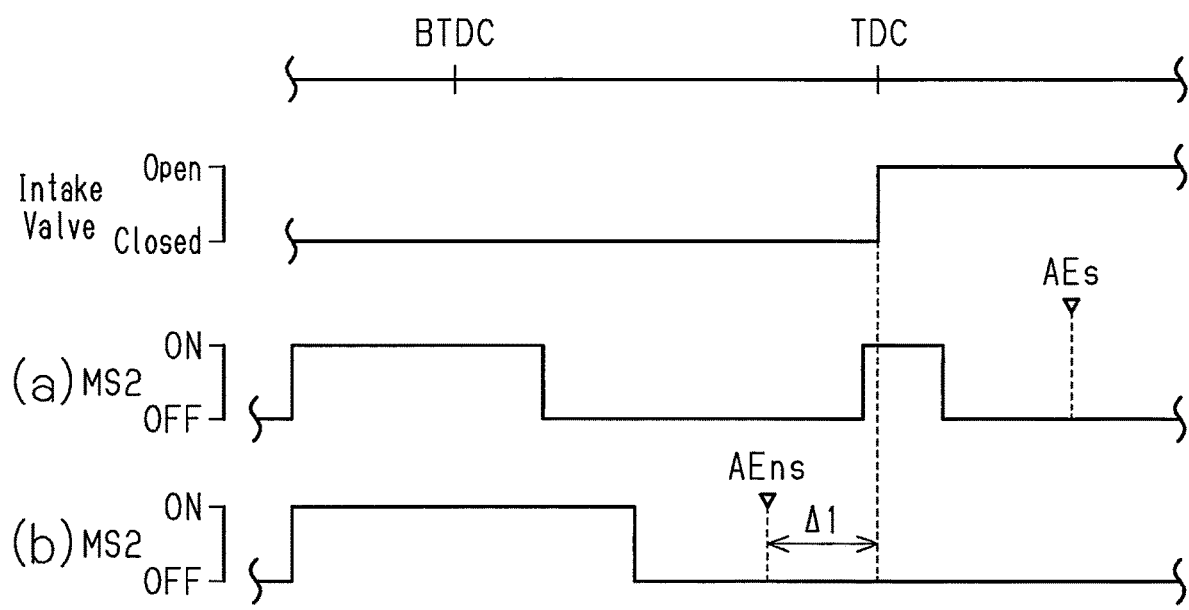
FIG. 12 is a timing diagram in which sections (a) and (b) show injection patterns in the internal combustion engine shown in FIG. 10.

In this embodiment, the fuel injection process may be any of two processes, the process illustrated in section (a) of FIG. 12 and the process illustrated in section (b) of FIG. 12.

Section (a) of FIG. 12 shows a multiple injection process in which two fuel injections, an intake-synchronous injection in which fuel is injected in synchronization with a period in which the intake valve 18 is open and an intake-asynchronous injection in which fuel is injected at a time advanced with respect to the intake-synchronous injection, are executed. More specifically, in the intake-synchronous injection, fuel is injected in such a manner that the period in which the fuel injected from the port injection valve 16 arrives at the position of the intake valve 18 yet to be opened (that is, the downstream-side end of the intake port, or in other words, an inlet of the intake port into the combustion chamber 24) is included in the period in which the intake valve 18 is open. The starting point of the period in which the fuel injected from the port injection valve 16 arrives at the position of the intake valve 18 yet to be opened is the time when the part of the fuel injected from the port injection valve 16 at the earliest timing arrives at the position of the intake valve 18 yet to be opened. The end point of the period in which the fuel injected from the port injection valve 16 arrives at the position of the intake valve 18 yet to be opened is the time when the part of the fuel injected from the port injection valve 16 at the latest timing arrives at the position of the intake valve 18 yet to be opened. In contrast, in the intake-asynchronous injection, fuel is injected in such a manner that the fuel injected from the port injection valve 16 arrives at the intake valve 18 before the intake valve 18 is opened. In other words, the intake-asynchronous injection is an injection in which the fuel injected from the port injection valve 16 dwells in the intake passage 12 until the intake valve 18 is opened, and then flows into the combustion chamber 24 when the intake valve 18 is opened. In this embodiment, in the intake-asynchronous injection, fuel is injected in such a manner that the period in which the fuel injected from the port injection valve 16 arrives at the position of the intake valve 18 yet to be opened is included in the period in which the intake valve 18 is closed.

Section (b) of FIG. 12 shows a single injection process in which only the intake-asynchronous injection is executed.

In this embodiment, the multiple injection process is executed to reduce the count (PN) of particulate matter (PM) in the exhaust gas. That is, if the coolant temperature THW is somewhat low, and the single injection process is executed in a region where the charging efficiency η is somewhat high, PN tends to increase. A possible reason for this is that, as the charging efficiency η increases, the required injection amount Qd increases, and as a result, the amount of fuel deposited in the intake passage 12 increases. More specifically, it is conjectured that PN increases because, if the amount of fuel deposited in the intake passage 12 increases to some extent, shearing of the deposited fuel occurs, and therefore part of the deposited fuel flows into the combustion chamber 24 in the form of liquid drops. To avoid this, in this embodiment, in the region where the charging efficiency η is somewhat high, part of the required injection amount Qd is injected by intake-synchronous injection. Therefore, despite the high required injection amount Qd, the amount of fuel deposited in the intake passage 12 can be reduced, and PN can be reduced.

In the transient correction process M52 shown in FIG. 11, the transient correction amount ΔQ is set at a value other than 0 even when switching occurs between the multiple injection process and the single injection process. That is, the amount of fuel deposited in the intake passage 12 is greater when the single injection process is being executed than when the multiple injection process is being executed. Therefore, when switching from the single injection process to the multiple injection process occurs, for example, the amount of fuel deposited in the intake passage 12 transiently decreases, and the amount of fuel flowing into the combustion chamber 24 is increased by addition of the decrement of the amount of fuel deposited in the intake passage 12. Thus, setting the transient correction amount ΔQ at a value smaller than 0, the amount of fuel flowing into the combustion chamber 24 is prevented from being excessive.

Figure 13:
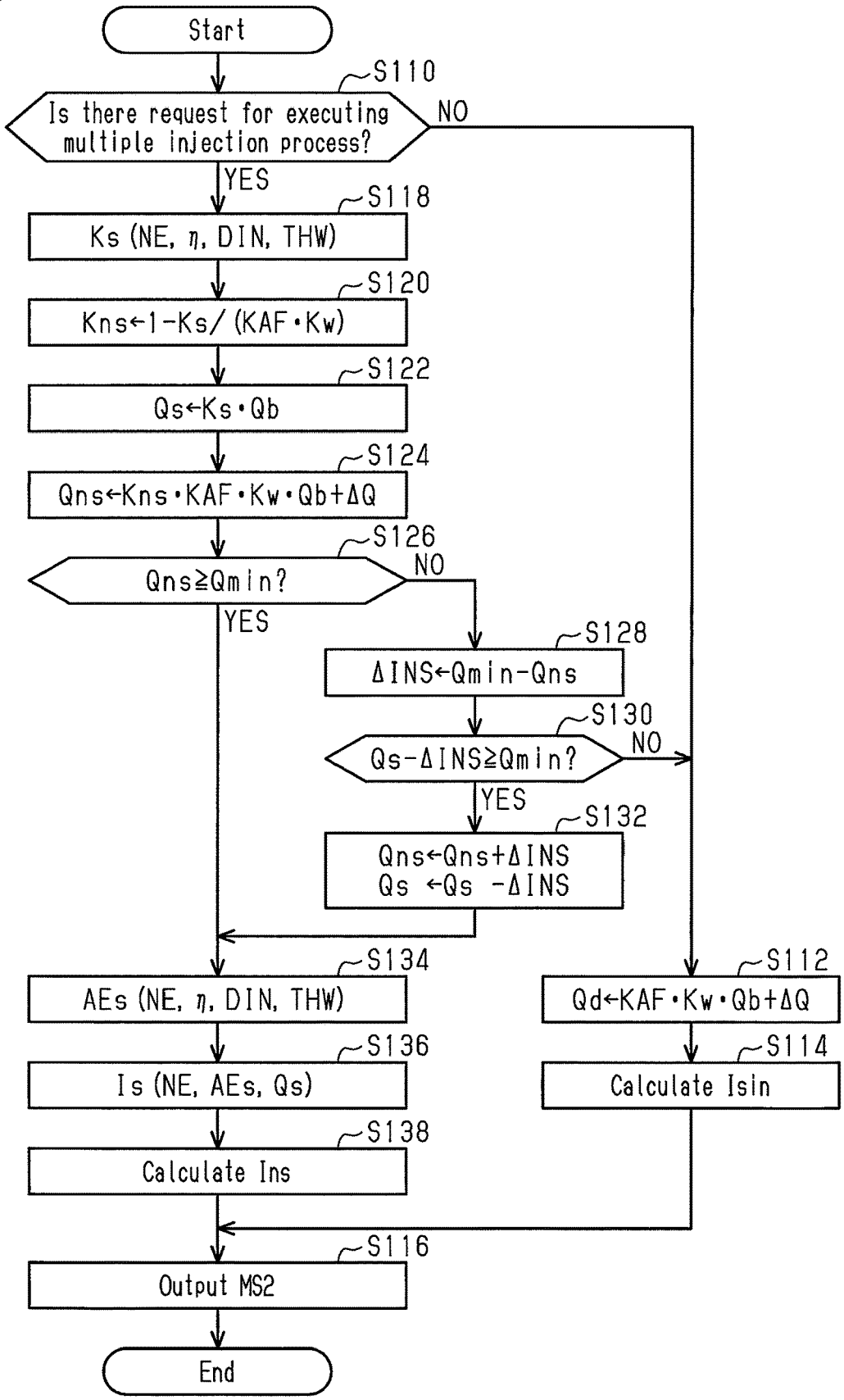
FIG. 13 is a flowchart showing an injection valve manipulation process in the internal combustion engine shown in FIG. 10.

FIG. 13 shows a procedure of the injection valve manipulation process M54. The process shown in FIG. 13 is implemented by the CPU 72 repeatedly executing a program stored in the ROM 74 at predetermined cycles. In the following, numerals with the prefix S denote step numbers in each process.

In the process shown in FIG. 13, the CPU 72 first determines whether or not there is a request for executing the multiple injection process (S110). The CPU 72 determines that there is a request for executing the multiple injection process if the logical conjunction of the following conditions (vi), (vii) and (viii) is true.

The condition (vi) is a condition that the charging efficiency η is equal to or higher than a predetermined value.

This condition means that, if the single injection process is executed, the amount of fuel deposited in the intake passage 12 can become excessively great, and PN can become significant.

The condition (vii) is a condition that the engine speed NE is equal to or lower than a predetermined speed NEth. This condition is a condition that a time interval equal to or longer than a predetermined time that depends on the structure of the port injection valve 16 can be ensured between the time when the intake-asynchronous injection is ended and the time when the intake-synchronous injection is started. Furthermore, since the multiple injection process imposes a higher computational load than the single injection process, this condition is a condition that the amount of generated heat is prevented from being excessive because of the increase of the computational load on the controller 70.

The condition (viii) is a condition that the coolant temperature THW is equal to or lower than the prescribed temperature Tth described above. This condition means that the amount of fuel deposited in the intake passage 12 can increase, and PN can become significant.

If the CPU 72 determines that there is no request for executing the multiple injection process (NO in S110), the CPU 72 calculates the required injection amount Qd on the assumption that the single injection process is to be executed (S112).

The CPU 72 then calculates an injection starting time I sin of the single injection process (S114). More specifically, as shown in section (b) of FIG. 12, the CPU 72 designates, as an arrival end time AEns, the time advanced by a predetermined amount Δ1 with respect to the time when the intake valve 18 is opened (indicated by the dash line extending across sections (a) and (b) of FIG. 12). The arrival end time AEns is a target value of the time when the part of the fuel injected from the port injection valve 16 that is injected at the latest timing arrives at the position of the intake valve 18 in the period in which the intake valve 18 is closed. The CPU 72 then designates, as the injection starting time I sin of the single injection process, the time advanced with respect to the arrival end time AEns by a sum of the duration of the injection by the port injection valve 16 determined by the required injection amount and the flight time required for the fuel injected from the port injection valve 16 to arrives at the position of the intake valve 18 in the period in which the intake valve 18 is closed, for example. Referring back to FIG. 13, the CPU 72 outputs the manipulation signal MS2 to the port injection valve 16 to manipulate the port injection valve 16 to inject the required injection amount Qd of fuel at the injection starting time I sin of the single injection process (S116).

In contrast, if the CPU 72 determines that there is a request for executing the multiple injection process (YES in S110), the CPU 72 calculates a synchronous injection proportion Ks, which is a ratio of the synchronous injection amount in the base injection amount Qb (S118). The CPU 72 calculates the synchronous injection proportion Ks according to the engine speed NE, the charging efficiency η, the coolant temperature THW, and the intake phase difference DIN. More specifically, with map data including the engine speed NE, the charging efficiency η, the coolant temperature THW and the intake phase difference DIN as input variables and the synchronous injection proportion Ks as an output variable stored in the ROM 74 in advance, the CPU 72 calculates the synchronous injection proportion Ks by map operation.

The map data is a data set including discrete values of an input variable and values of an output variable corresponding to the values of the input variable. The map operation can be an operation in which if the value of a relevant input variable agrees with any of the values of the input variable in the map data, the corresponding value of the output variable in the map data is adopted as an operation result, and if the value of the relevant input variable does not agree with any of the values of the input variable in the map data, a value obtained by interpolation of a plurality of values of the output variable in the map data is adopted as an operation result.

The CPU 72 then calculates an asynchronous injection proportion Kns, which is a proportion of an asynchronous injection amount Qns with respect to the required injection amount Qd minus the transient correction amount ΔQ (S120). More specifically, the CPU 72 calculates the asynchronous injection proportion Kns by subtracting Ks/(KAF·Kw) from 1. The CPU 72 then substitutes the base injection amount Qb multiplied by the synchronous injection proportion Ks into the synchronous injection amount Qs (S122). The CPU 72 then substitutes the sum of the transient correction amount ΔQ and KAF·Kw·Qb, which is the required injection amount Qd minus the transient correction amount ΔQ, multiplied by the asynchronous injection proportion Kns into the asynchronous injection amount Qns (S124).

Thus, the asynchronous injection amount Qns assumes the following value.

$$Kns \cdot KAF \cdot Kw \cdot Qb + \Delta Q = KAF \cdot Kw \cdot Qb - Ks \cdot Qb + \Delta Q$$

Therefore, the sum of the asynchronous injection amount Qns and the synchronous injection amount Qs is KAF·Kw·Qb+ΔQ, which is equal to the required injection amount Qd. That is, through the processings of S118 to S124, the required injection amount Qd of fuel is divided into the asynchronous injection amount Qns and the synchronous injection amount Qs. The synchronous injection amount Qs is Ks·Qb regardless of the values of the feedback correction coefficient KAF, the low-temperature fuel increasing coefficient Kw and the transient correction amount ΔQ. This means that after the base injection amount Qb is divided into the synchronous injection amount Qs and (1−Ks)·Qb, (1−Ks)·Qb is corrected to obtain the asynchronous injection amount Qns. A reason why the synchronous injection amount Qs is fixed is that the constituents of the exhaust gas more significantly vary when the synchronous injection amount Qs is changed than when the asynchronous injection amount Qns is changed.

The CPU 72 then determines whether or not the asynchronous injection amount Qns is equal to or greater than a minimum injection amount Qmin determined by the structure of the port injection valve 16 (S126). The minimum injection amount Qmin is a lower limit of the amount of fuel injected from the port injection valve 16 with an allowable precision. If the CPU 72 determines that the asynchronous injection amount Qns is lower than the minimum injection amount Qmin (NO in S126), the CPU 72 calculates a difference ΔINS, which is the minimum injection amount Qmin minus the asynchronous injection amount Qns (S128). The CPU 72 then determines whether or not the synchronous injection amount Qs minus the difference ΔINS is equal to or greater than the minimum injection amount Qmin (S130). If the CPU 72 determines that the synchronous injection amount Qs minus the difference ΔINS is smaller than the minimum injection amount Qmin (NO in S130), the CPU 72 determines that the synchronous injection amount Qs and the asynchronous injection amount Qns cannot be set to be equal to or greater than the minimum injection amount Qmin at the same time, and proceeds to the processing of S112.

In contrast, if the CPU 72 determines that the synchronous injection amount Qs minus the difference ΔINS is equal to or greater than the minimum injection amount Qmin (YES in S130), the CPU 72 corrects the asynchronous injection amount Qns calculated in the processing of S124 by increasing the asynchronous injection amount Qns by the difference ΔINS, and corrects the synchronous injection amount Qs calculated in the processing of S122 by reducing the synchronous injection amount Qs by the difference ΔINS (S132).

When the processing of S132 is completed, or the result of the determination in S126 is affirmative, the CPU 72 calculates an arrival end time AEs shown in section (a) of FIG. 12 based on the engine speed NE, the charging efficiency η, the coolant temperature THW and the intake phase difference DIN (S134). Based on the arrival end time, the synchronous injection amount Qs and the engine speed NE, the CPU 72 then calculates the injection starting time Is of the intake-synchronous injection (S136). The greater the synchronous injection amount Qs, the more advanced the injection starting time Is of the intake-synchronous injection calculated by the CPU 72 is. The higher the engine speed NE, the more advanced the injection starting time Is of the intake-synchronous injection calculated by the CPU 72 is. The arrival end time AEs is adapted so that the fuel injected from the port injection valve 16 does not arrive at the position of the intake valve 18 in the period in which the intake valve 18 is closed before the intake valve 18 is opened. The CPU 72 then calculates the injection starting time Ins of the intake-asynchronous injection based on the injection starting time Is of the intake-synchronous injection (S138). In this example, the time interval between the injection ending time of the intake-asynchronous injection and the injection starting time Is of the intake-synchronous injection is set to be equal to or longer than the predetermined time described above.

Through the process described above, the injection starting time Is of the intake-synchronous injection is set independently of the injection starting time Ins of the intake-asynchronous injection. A reason for this is that the arrival end time of the intake-synchronous injection is particularly easily affected by PN of the exhaust gas or HC in the exhaust gas.

Figure 14A:
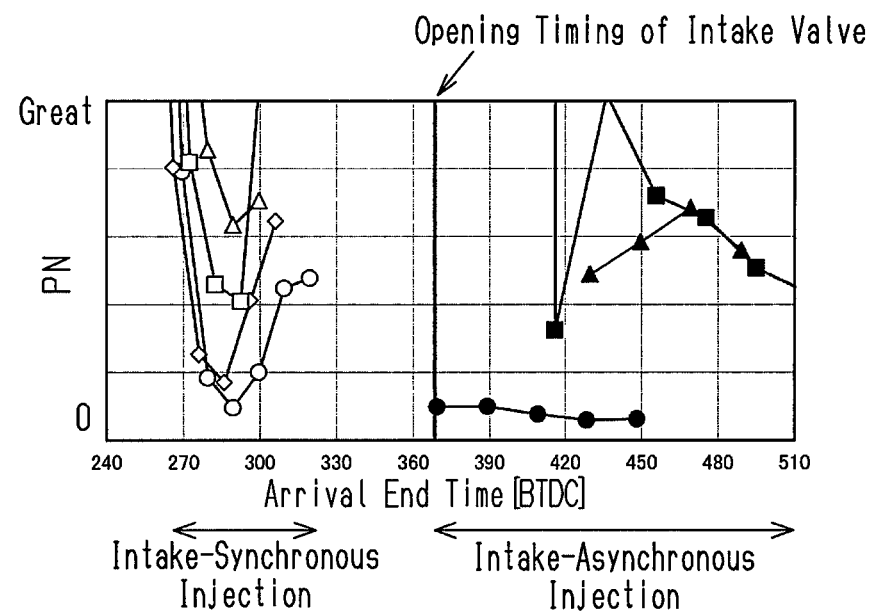
FIG. 14A is a diagram for illustrating a significance of setting of an arrival end time in the internal combustion engine shown in FIG. 10.
Figure 14B:
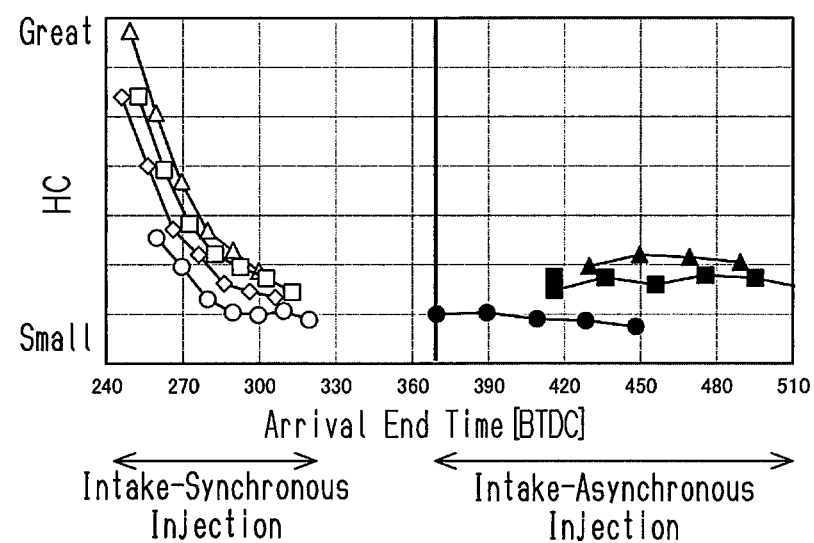
FIG. 14B is a diagram for illustrating a significance of setting of an arrival end time in the internal combustion engine shown in FIG. 10.

FIG. 14A shows PN in the case where the arrival end time is changed in the intake-asynchronous injection and the intake-synchronous injection, and FIG. 14B shows the amount of generated HC in the case where the arrival end time is changed in the intake-asynchronous injection and the intake-synchronous injection. In these drawings, hollow dots represent a case where the arrival end time of the intake-asynchronous injection is fixed and the arrival end time of the intake-synchronous injection is changed. Solid dots represent a case where the arrival end time of the intake-synchronous injection is fixed and the arrival end time of the intake-asynchronous injection is changed. Circular dots, diamond-shaped dots, square dots and triangular dots correspond to ratios of the asynchronous injection amount Qns to the synchronous injection amount Qs of 8:2, 7:3, 6:4, and 5:5, respectively.

As shown by the hollow dots in FIGS. 14A and 14B, regardless of the ratio between the asynchronous injection amount Qns and the synchronous injection amount Qs, PN and the amount of generated HC largely vary as the arrival end time of the intake-synchronous injection varies. Thus, in this embodiment, the arrival end time of the intake-synchronous injection is set at an adequate value that can reduce PN and the amount of generated HC.

Referring back to FIG. 13, the CPU 72 outputs the manipulation signal MS2 to the port injection valve 16 to manipulate the port injection valve 16 to inject the synchronous injection amount Qs of fuel at the injection starting time Is of the intake-synchronous injection and inject the asynchronous injection amount Qns of fuel at the injection starting time Ins of the intake-asynchronous injection (S116).

When the processing of S116 is completed, the CPU 72 ends the process shown in FIG. 13.

The operation and advantages of the present embodiment will now be described.

Figure 15:
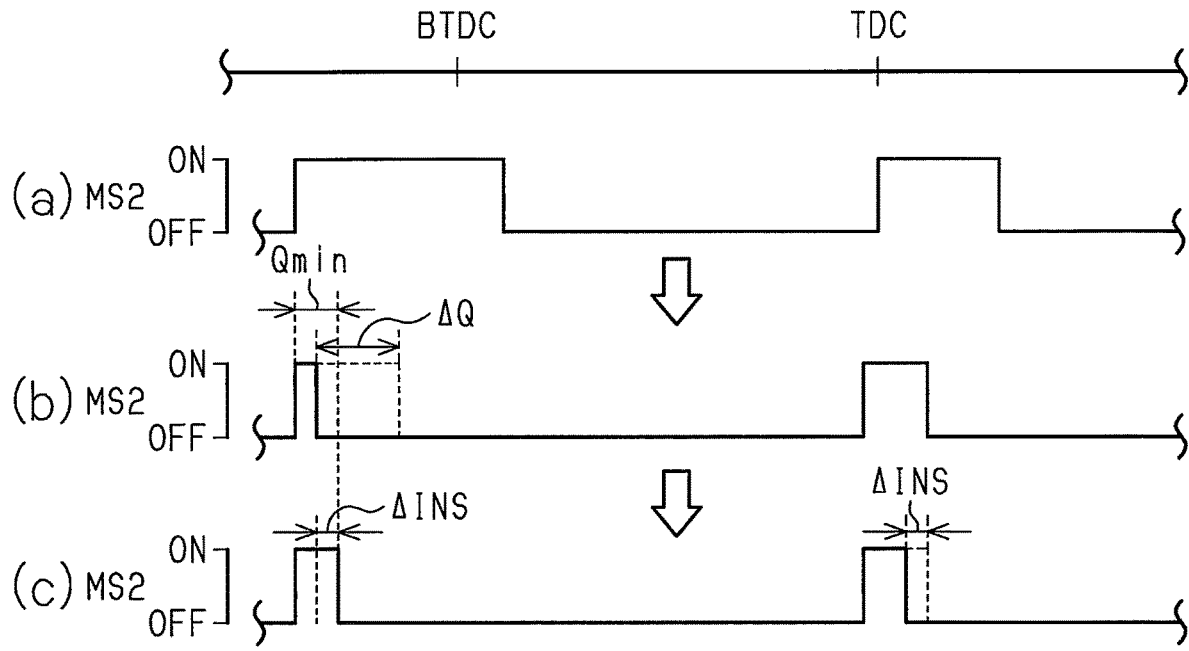
FIG. 15 is a timing diagram in which sections (a) to (c) illustrate operations in the internal combustion engine shown in FIG. 10.

FIG. 15 illustrates an effect of the transient correction amount ΔQ in the case where the charging efficiency η decreases. Section (a) of FIG. 15 shows the asynchronous injection amount Qns and the synchronous injection amount Qs before the charging efficiency η decreases by the lengths of the respective injection periods. Section (b) of FIG. 15 shows the asynchronous injection amount Qns and the synchronous injection amount Qs calculated in the processing of S122 and S124 when the charging efficiency η decreases by the lengths of the respective injection periods. Section (c) of FIG. 15 shows the asynchronous injection amount Qns and the synchronous injection amount Qs calculated in the processing of S132 when the charging efficiency η decreases by the lengths of the respective injection periods.

As shown in section (b) of FIG. 15, if the charging efficiency η decreases, the asynchronous injection amount Qns becomes very small because of the transient correction amount ΔQ and becomes lower than the minimum injection amount Qmin. In this case, the CPU 72 corrects the synchronous injection amount Qs by reducing the synchronous injection amount Qs by the difference ΔINS between the asynchronous injection amount Qns and the minimum injection amount Qmin, and corrects the asynchronous injection amount Qns by increasing the asynchronous injection amount Qns to the minimum injection amount Qmin. Therefore, both the asynchronous injection amount Qns and the synchronous injection amount Qs can be set to be equal to or greater than the minimum injection amount Qmin.

Figure 16:
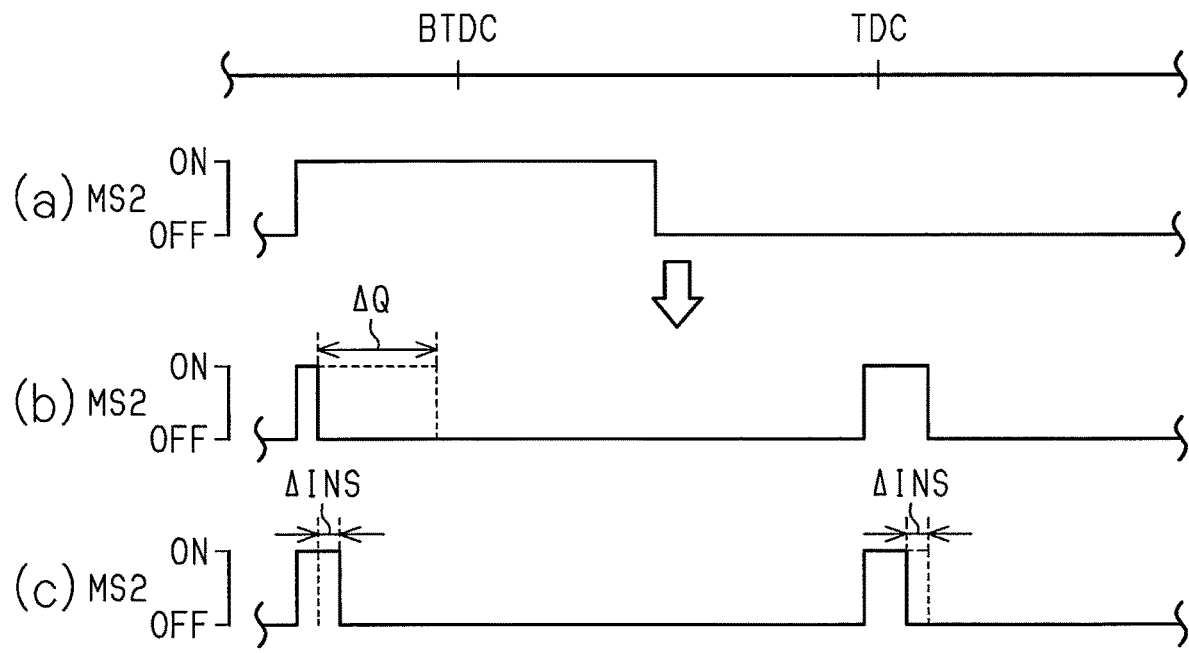
FIG. 16 is a timing diagram in which sections (a) to (c) illustrate operations in the internal combustion engine shown in FIG. 10.

FIG. 16 illustrates a case where switching from the single injection process to the multiple injection process occurs. Section (a) of FIG. 16 shows the injection amount in the single injection process by the length of the injection period. Section (b) of FIG. 16 shows the asynchronous injection amount Qns and the synchronous injection amount Qs calculated in the processing of S122 and S124 when the switching to the multiple injection process occurs by the lengths of the respective injection periods. Section (c) of FIG. 16 shows the asynchronous injection amount Qns and the synchronous injection amount Qs calculated in the processing of S132 when the switching to the multiple injection process occurs by the lengths of the respective injection periods.

As shown in section (b) of FIG. 16, if the switching from the single injection process to the multiple injection process occurs, the asynchronous injection amount Qns becomes very small because of the transient correction amount ΔQ and becomes lower than the minimum injection amount Qmin. In this case, the CPU 72 corrects the synchronous injection amount Qs by reducing the synchronous injection amount Qs by the difference ΔINS between the asynchronous injection amount Qns and the minimum injection amount Qmin, and corrects the asynchronous injection amount Qns by increasing the asynchronous injection amount Qns to the minimum injection amount Qmin. Therefore, both the asynchronous injection amount Qns and the synchronous injection amount Qs can be set to be equal to or greater than the minimum injection amount Qmin.

A situation where the absolute value of the transient correction amount $\Delta Q$ increases when the switching from the single injection process to the multiple injection process occurs arises when the engine speed NE decreases, for example. That is, when the engine speed NE is high, the CPU 72 determines that the condition (vii) is not satisfied in the processing of S110, and executes the single injection process. Then, if the engine speed NE decreases, the CPU 72 determines that the condition (vii) is satisfied, and switches to the multiple injection process. In this case, the charging efficiency $\eta$ can become relatively high, and the absolute value of the transient correction amount $\Delta Q$ can increase because the difference between the amount of fuel deposited in the intake passage 12 when the single injection process is executed and the amount of fuel deposited in the intake passage 12 when the multiple injection process is executed is great.

<Correspondence>

The correspondence between the items in the above-described embodiments and the items described in the above SUMMARY is as follows. Below, the correspondence is shown for each of the numbers in the examples described in the above SUMMARY.

[11] and [19] The required injection amount calculation process corresponds to the base injection amount calculation process M30, the feedback process M32, the low-temperature correction process M50 and the transient correction process M52. That is, the required injection amount Qd is Qb·KAF·Kw+$\Delta Q$, and therefore, the required injection amount Qd can be regarded as being calculated by calculating the base injection amount Qb, the feedback correction coefficient KAF, the low-temperature fuel increasing coefficient Kw and the transient correction amount $\Delta Q$ in the processes described above.

The multiple injection process corresponds to the processing of S116 following the processing of S138.

The fuel reduction process corresponds to the processing of S124 in the case where the transient correction amount $\Delta Q$ is negative.

The dual fuel amount correction process corresponds to the processing of S132. The fuel injection controller corresponds to the controller 70.

[12] The selection process corresponds to the processings of S110 and S130.

[13] The example 13 corresponds to the process illustrated in FIG. 15.

[14] The example 14 corresponds to the process illustrated in FIG. 16.

[15] The division process corresponds to the processing of S118 to S124.

Other Embodiments

The present embodiment may be modified as follows. The present embodiment and the following modifications can be combined as long as the combined modifications remain technically consistent with each other.

Regarding Required Injection Amount

The required injection amount Qd may be the base injection amount Qb corrected by not only the low-temperature fuel increasing coefficient Kw, the transient correction amount $\Delta Q$ and the feedback correction coefficient KAF but also the learned value LAF. The process of calculating the learned value LAF is a process of receiving the feedback correction coefficient KAF as an input and updating the learned value LAF so that the ratio of correction of the base injection amount Qb by the feedback correction coefficient KAF decreases. The learned value LAF is desirably stored in an electrically rewritten nonvolatile memory.

Furthermore, the required injection amount Qd may be calculated so that, the greater the ratio of the disturbing fuel, the smaller the required injection amount Qd due to the feedforward control based on the disturbing fuel ratio, for example. The disturbing fuel ratio is a ratio of the amount of the fuel flowing into the combustion chamber 24 of the internal combustion engine 10 other than the fuel injected from the port injection valve 16 in one combustion cycle to the total amount of the fuel flowing into the combustion chamber 24. If the internal combustion engine is provided with a canister that collects fuel vapor from a fuel tank that stores the fuel injected from the port injection valve 16 and an adjusting device that adjusts the amount of fluid flowing from the canister into the intake passage 12, for example, the fuel vapor flowing from the canister into the intake passage 12 may be the disturbing fuel. Furthermore, if the internal combustion engine is provided with a system that feeds the fuel vapor in the crankcase back to the intake passage 12, for example, the fuel vapor flowing from the crankcase into the intake passage 12 is also included in the disturbing fuel.

Regarding Fuel Reduction Process

As described in the above Required Injection Amount, if the required injection amount is calculated according to the disturbing fuel ratio, the process of reducing the required injection amount by taking the disturbing fuel into consideration can be included in the fuel reduction process.

Regarding Intake-Asynchronous Injection

In the embodiment described above, the intake-asynchronous injection involves injecting fuel in such a manner that the period in which the fuel injected from the port injection valve 16 arrives at the position of the intake valve 18 yet to be opened is included in the period in which the intake valve 18 is closed. However, the present invention is not limited to this implementation. For example, if the engine speed NE is high, and the asynchronous injection amount Qns is excessively high, a part of the period in which the fuel injected from the port injection valve 16 arrives at the position of the intake valve 18 yet to be opened may overlap with the period in which the intake valve 18 is open.

Regarding Intake-Synchronous Injection

In the embodiment described above, the arrival end time is set based on the engine speed NE, the charging efficiency $\eta$, the coolant temperature THW and the intake phase difference DIN. However, the present invention is not limited to this implementation. For example, the injection starting time Is of the intake-synchronous injection may be set based on the engine speed NE, the charging efficiency $\eta$, the coolant temperature THW and the intake phase difference DIN. Furthermore, as a parameter of load, which is a parameter of the amount of fresh air introduced into the combustion chamber 24, the base injection amount Qb may be used instead of the charging efficiency $\eta$, for example. Furthermore, with regard to the four parameters, that is, the engine speed NE, the load, the coolant temperature THW and the intake phase difference DIN, the arrival end time or the injection starting time Is of the intake-synchronous injection may be variably set based on only three, two or one of the four parameters.

Regarding Single Injection Process

In the embodiment described above, the single injection process is defined as injecting fuel in such a manner that the period in which the fuel injected from the port injection valve 16 arrives at the position of the intake valve 18 yet to be opened is included in the period in which the intake valve 18 is closed. However, the present invention is not limited to this implementation. For example, if the required injection amount Qd is high, a part of the period in which the fuel injected from the port injection valve 16 arrives at the position of the intake valve 18 yet to be opened may overlap with the period in which the intake valve 18 is open. Note that to perform the single injection process is not essential.

Regarding Selection Process

The conditions for executing the multiple injection process are not limited to the conditions (vi), (vii) and (viii) described above. For example, the condition (vii) described above may be replaced with a condition (ix) that Kw·KAF·Qb is equal to or lower than a prescribed value. Note that the higher the engine speed NE, the smaller the prescribed value is. In this case, the transient correction amount ΔQ can also be great when switching to the multiple injection process occurs as a result of the coolant temperature THW rising. That is, when the coolant temperature THW is low, the low-temperature fuel increasing coefficient Kw is high, so that the CPU 72 determines that the condition (ix) is not satisfied. However, when the coolant temperature THW slightly rises, and the CPU 72 determines that the condition (ix) is satisfied, the CPU 72 switches to the multiple injection process, and at this time, Kw·KAF·Qb is great. Therefore, the amount of fuel deposited in the intake passage 12 greatly differs between when the single injection process is being executed and when the multiple injection process is being executed, and therefore, the absolute value of the transient correction amount ΔQ is great.

Regarding Method of Dividing Required Injection Amount

In the embodiment described above, the synchronous injection proportion Ks, which indicates the proportion of the synchronous injection amount Qs in the base injection amount Qb, is variably set based on the engine speed NE, the charging efficiency η, the coolant temperature THW and the intake phase difference DIN. However, the present invention is not limited to this implementation. For example, as a load parameter, which is a parameter of the amount of fresh air introduced into the combustion chamber 24, the required injection amount Qd may be used instead of the charging efficiency η. Furthermore, with regard to the four parameters, that is, the load parameter, the engine speed NE, the coolant temperature THW and the intake phase difference DIN, the synchronous injection proportion Ks may be variably set based on only three, two or one of the four parameters. In such cases, at least one of the load parameter and the coolant temperature THW is desirably used to variably set the synchronous injection proportion Ks. Other parameters than the four parameters described above, such as the intake air pressure or the flow velocity of the intake air, may also be used. However, the intake air pressure and the flow velocity of the intake air can be grasped based on the four parameters described above.

The asynchronous injection proportion Kns does not necessarily need to be the amount that indicates the proportion of the asynchronous injection amount Qns in the required injection amount minus the transient correction amount ΔQ. For example, the asynchronous injection proportion Kns may be an amount that indicates the proportion of the asynchronous injection amount Qns in the base injection amount Qb. In that case, a relation Kns+Ks=1 holds. In that case, the final asynchronous injection amount Qns can be Qb·Kns+Qb·(KAF·Kw−1)+ΔQ.

To determine the synchronous injection proportion Ks is not essential. For example, in the embodiment described above or a modification thereof, the synchronous injection amount Qs may be calculated based on a parameter that determines the synchronous injection proportion Ks. In that case, the asynchronous injection amount Qns can be Qb·KAF·Kw+ΔQ−Qs.

For example, the synchronous injection amount Qs may be a value KAF·Qb, which is the base injection amount Qb corrected by the feedback correction coefficient KAF, split by using the synchronous injection proportion Ks. In this case, the synchronous injection amount Qs is Ks·KAF·Qb.

In the embodiment described above, when the charging efficiency η decreases, only the asynchronous injection amount Qns is corrected by reduction by the transient correction amount ΔQ. However, the present invention is not limited to this implementation. For example, only 1% of the transient correction amount ΔQ may be used as a fuel reduction correction amount for the synchronous injection amount Qs.

In the embodiment described above, when switching from the single injection process to the multiple injection process occurs, only the asynchronous injection amount Qns is corrected by reduction by the transient correction amount ΔQ. However, the present invention is not limited to this implementation. For example, only 1% of the transient correction amount ΔQ may be allocated to the synchronous injection amount Qs.

Regarding Variable Actuation Device for Intake Valve

The variable actuation device that modifies the actuation of the intake valve 18 is not limited to the intake valve timing adjusting device 44. For example, a device that modified the lift of the intake valve 18 may be used. In that case, the parameter that indicates the valve actuation of the intake valve 18 is the lift or the like, instead of the intake phase difference DIN.

Regarding Fuel Injection Controller

The fuel injection controller is not limited to a device that includes the CPU 72 and the ROM 74 and executes software processing. For example, at least part of the processes executed by the software in the above-described embodiments may be executed by hardware circuits dedicated to execution of these processes (such as ASIC). That is, the fuel injection controller may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Other Modifications

For example, if a device capable of changing the injection pressure of the port injection valve 16 is provided, when the result of the determination in the processing of S126 is negative, the injection pressure for the subsequent cylinder can be lowered so that the result of the determination in the processing of S126 is affirmative for the subsequent cylinder.

The internal combustion engine 10 does not necessarily need to include the variable actuation device that modifies the actuation of the intake valve 18. The internal combustion engine 10 does not necessarily need to include the throttle valve 14.

The invention claimed is:

1. A controller for an internal combustion engine, the internal combustion engine including a port injection valve that injects fuel into an intake passage, and the controller being configured to perform:
   a base injection amount calculation process of calculating a base injection amount, the base injection amount being an injection amount proportional to an amount of fresh air introduced into a cylinder of the internal combustion engine;
   a division process of dividing the base injection amount into a synchronous injection amount and an asynchronous injection amount, the synchronous injection amount being an injection amount of an intake-synchronous injection in which the fuel is injected in synchronization with a period in which an intake valve is open, and the asynchronous injection amount being an injection amount of an intake-asynchronous injection in which the fuel is injected at a time advanced with respect to the intake-synchronous injection;
   a required correction amount outputting process of outputting a required correction amount for the base injection amount;
   a selective correction process of correcting the asynchronous injection amount according to the required correction amount and not correcting the synchronous injection amount; and
   a manipulation process of manipulating the port injection valve according to the synchronous injection amount and the corrected asynchronous injection amount,
   wherein the synchronous injection amount and the corrected asynchronous injection amount are injected from the port injection valve.

2. The controller according to claim 1, wherein
   the required correction amount includes a required amount for setting a decrement of the base injection amount to be greater when a disturbing fuel ratio is higher than when the disturbing fuel ratio is lower in a feedforward control based on the disturbing fuel ratio, and
   the disturbing fuel ratio is a ratio of an amount of fuel flowing into a combustion chamber of the internal combustion engine other than the fuel injected from the port injection valve to a total amount of fuel flowing into the combustion chamber in one combustion cycle.

3. The controller according to claim 2, wherein
   the internal combustion engine further includes:
      a canister that collects fuel vapor from a fuel tank, which stores the fuel injected from the port injection valve; and
      an adjusting device that adjusts an amount of fluid flowing from the canister into the intake passage,
   the controller is configured to perform a flow rate control process of controlling a flow rate of the fuel vapor flowing from the canister into the intake passage by manipulating the adjusting device,
   the required correction amount includes a required amount for setting the decrement of the base injection amount to be greater when a vapor ratio as the disturbing fuel ratio is high than when the vapor ratio is low, and
   the vapor ratio is a ratio of the flow rate of the fuel vapor to a flow rate of the fluid in the intake passage.

4. The controller according to claim 1, wherein the required correction amount includes a required amount for setting an increment of the base injection amount to be greater when a temperature of the internal combustion engine is low than when the temperature is high.

5. The controller according to claim 1, wherein
   the required correction amount includes a required amount for correcting the base injection amount according to a manipulation amount for feedback-controlling a detection value of an air-fuel ratio sensor to a target value, and
   the air-fuel ratio sensor is provided in an exhaust passage of the internal combustion engine.

6. The controller according to claim 1, wherein the required correction amount includes a required amount for correcting the base injection amount according to a variation of the amount of fresh air in a transient period in which the amount of the introduced fresh air varies.

7. The controller according to claim 1, wherein
   the controller is further configured to perform a required injection amount setting process of setting a required injection amount for adjusting an air-fuel ratio to a target air-fuel ratio based on the amount of fresh air introduced into the cylinder of the internal combustion engine,
   the manipulation process includes
      dividing the required injection amount into the synchronous injection amount and the asynchronous injection amount, and
      manipulating the port injection valve to successively injecting the asynchronous injection amount of fuel and the synchronous injection amount of fuel, and
   the manipulation process includes a process of setting the required injection amount to be higher when a temperature of the internal combustion engine is low than when the temperature is high, the process setting an increment of the synchronous injection amount at the time when the temperature of the internal combustion engine is low with respect to the time when the temperature is high to be smaller than an increment of the asynchronous injection amount at the time when the temperature of the internal combustion engine is low with respect to the time when the temperature is high.

8. The controller according to claim 7, wherein
   the manipulation process includes a process of setting the required injection amount to be smaller when a disturbing fuel ratio is high than when the disturbing fuel ratio is low, the process setting a decrement of the synchronous injection amount at the time when the disturbing fuel ratio is high with respect to the time when the disturbing fuel ratio is low to be smaller than a decrement of the asynchronous injection amount at the time when the disturbing fuel ratio is high with respect to the time when the disturbing fuel ratio is low, and
   the disturbing fuel ratio is a ratio of an amount of fuel flowing into a combustion chamber of the internal combustion engine other than the fuel injected from the port injection valve to a total amount of fuel flowing into the combustion chamber in one combustion cycle.

9. The controller according to claim 8, wherein the internal combustion engine further includes:
- a canister that collects fuel vapor from a fuel tank, which stores the fuel injected from the port injection valve; and
- an adjusting device that adjusts an amount of fluid flowing from the canister into the intake passage, the controller is configured to perform a flow rate control process of controlling a flow rate of the fuel vapor flowing from the canister into the intake passage by manipulating the adjusting device, the manipulation process includes a process of setting the required injection amount to be smaller when a vapor ratio as the disturbing fuel ratio is high than when the vapor ratio is low, the process setting a decrement of the synchronous injection amount at the time when the vapor ratio is high with respect to the time when the vapor ratio is low to be smaller than a decrement of the asynchronous injection amount at the time when the vapor ratio is high with respect to the time when the vapor ratio is low, and the vapor ratio is a ratio of the flow rate of the fuel vapor to a flow rate of the fluid in the intake passage.

10. The controller according to claim 7, wherein the manipulation process includes a process of correcting the required injection amount in a transient period in which the amount of the introduced fresh air varies, the process setting an absolute value of a correction ratio of the synchronous injection amount in the transient period to be smaller than an absolute value of a correction ratio of the asynchronous injection amount in the transient period.

11. The controller according to claim 1, wherein the controller is configured to perform
- a required injection amount calculation process of calculating a required injection amount for adjusting an air-fuel ratio to a target air-fuel ratio based on the amount of fresh air introduced into the cylinder of the internal combustion engine;
- a multiple injection process of manipulating the port injection valve to perform the intake-synchronous injection and the intake-asynchronous injection to inject the required injection amount of fuel;
- a fuel reduction process of reducing the required injection amount even when the amount of the introduced fresh air does not vary if a predetermined condition is satisfied; and
- a fuel amount correction process of increasing the asynchronous injection amount to be equal to or greater than a minimum injection amount allowable for the port injection valve and reducing the synchronous injection amount if the asynchronous injection amount is smaller than the minimum injection amount, the asynchronous injection amount being determined by the required injection amount reduced in the fuel reduction process.

12. The controller according to claim 11, wherein the fuel amount correction process is to designate a difference between the asynchronous injection amount yet to be corrected and the minimum injection amount as an increasing correction amount for the asynchronous injection amount and a reduction correction amount for the synchronous injection amount, the controller is further configured to perform a selection process of selecting either a single injection process or the multiple injection process, the single injection process involving injecting the required injection amount of fuel by the intake-asynchronous injection by manipulating the port injection valve, and the selection process includes a process of selecting the single injection process if the synchronous injection amount reduced by the reduction correction amount is smaller than the minimum injection amount.

13. The controller according to claim 11, wherein the predetermined condition includes a condition that the amount of fresh air decreases, and the fuel reduction process includes a transient correction process of reducing the required injection amount by reducing the asynchronous injection amount if the amount of fresh air decreases.

14. The controller according to claim 11, wherein the controller is further configured to perform a selection process of selecting either a single injection process or the multiple injection process, the single injection process involving injecting the required injection amount of fuel by the intake-asynchronous injection by manipulating the port injection valve, the predetermined condition includes a condition that switching from a state where the single injection process is selected to a state where the multiple injection process is selected occurs, the fuel reduction process includes a transient correction process of reducing the required injection amount by reducing the asynchronous injection amount if switching from the state where the single injection process is selected in the selection process to the state where the multiple injection process is selected occurs.

15. The controller according to claim 11, wherein the division process involves dividing the required injection amount into the asynchronous injection amount and the synchronous injection amount, and the fuel reduction process is a process of reducing only the asynchronous injection amount.

\* \* \* \* \*